US009132966B1

(12) United States Patent
Groenewald et al.

(10) Patent No.: US 9,132,966 B1
(45) Date of Patent: Sep. 15, 2015

(54) VIBRATORY CONVEYOR

(71) Applicants: Eugene Groenewald, Woerden (NL); Dean Dunham, Walla Walla, WA (US); Michael T. Jones, Walla Walla, WA (US); Christopher A. Woiler, College Place, WA (US)

(72) Inventors: Eugene Groenewald, Woerden (NL); Dean Dunham, Walla Walla, WA (US); Michael T. Jones, Walla Walla, WA (US); Christopher A. Woiler, College Place, WA (US)

(73) Assignee: KEY TECHNOLOGY, INC., Walla Walla, WA (US)

( * ) Notice: Subject to any disclaimer, the term of this patent is extended or adjusted under 35 U.S.C. 154(b) by 0 days.

(21) Appl. No.: 14/496,264

(22) Filed: Sep. 25, 2014

(51) Int. Cl.
B65G 27/24 (2006.01)
B65G 27/04 (2006.01)
B65G 27/32 (2006.01)
B65G 27/30 (2006.01)

(52) U.S. Cl.
CPC ............. B65G 27/24 (2013.01); B65G 27/04 (2013.01); B65G 27/30 (2013.01); B65G 27/32 (2013.01); B65G 2812/0308 (2013.01); B65G 2812/0312 (2013.01); B65G 2812/0364 (2013.01)

(58) Field of Classification Search
CPC ................ B65G 27/26; B65G 27/30; B65G 2812/0364; B65G 27/24; B65G 2812/0308; B65G 2812/0312

USPC ........................................................ 198/769
See application file for complete search history.

(56) References Cited

U.S. PATENT DOCUMENTS

| 3,581,871 | A | * | 6/1971 | Forman ........................... 222/55 |
| 3,786,912 | A | * | 1/1974 | Taylor ............................ 198/769 |
| 4,378,064 | A | * | 3/1983 | Brown ........................... 198/769 |
| 5,462,155 | A | * | 10/1995 | Demar et al. .................. 198/760 |
| 6,105,753 | A | * | 8/2000 | Graham ......................... 198/763 |
| 7,213,700 | B2 | * | 5/2007 | Narukawa et al. ............ 198/763 |
| 8,096,407 | B1 | * | 1/2012 | Gregor .......................... 198/769 |
| 8,770,389 | B2 | * | 7/2014 | Millard et al. ................ 198/769 |
| 2001/0019009 | A1 | * | 9/2001 | Gilman ......................... 198/769 |
| 2001/0054543 | A1 | * | 12/2001 | Sleppy et al. ................ 198/766 |
| 2011/0316360 | A1 | * | 12/2011 | Rhinehart ...................... 310/20 |

FOREIGN PATENT DOCUMENTS

EP 2208693 A2 * 7/2010 ............. B65G 27/08

* cited by examiner

Primary Examiner — Mark A Deuble
(74) Attorney, Agent, or Firm — Randall Danskin, PS

(57) ABSTRACT

A vibratory conveyor is described and which includes a base frame; a reciprocally moveable conveyor bed which is resiliently supported on the base frame by a first multiplicity of elongated springs, and a conveyor bed driving assembly which includes a reciprocally moveable driver which is biasingly supported on the base frame and which further when energized, magnetically cooperates with the base frame so as to impart movement of the reciprocally moveable driver along a given path of travel, and which simultaneously generates a force which causes the reciprocally moveable conveyor bed to reciprocate in a predetermined manner so as to move product along the reciprocally moveable conveyor bed.

23 Claims, 22 Drawing Sheets

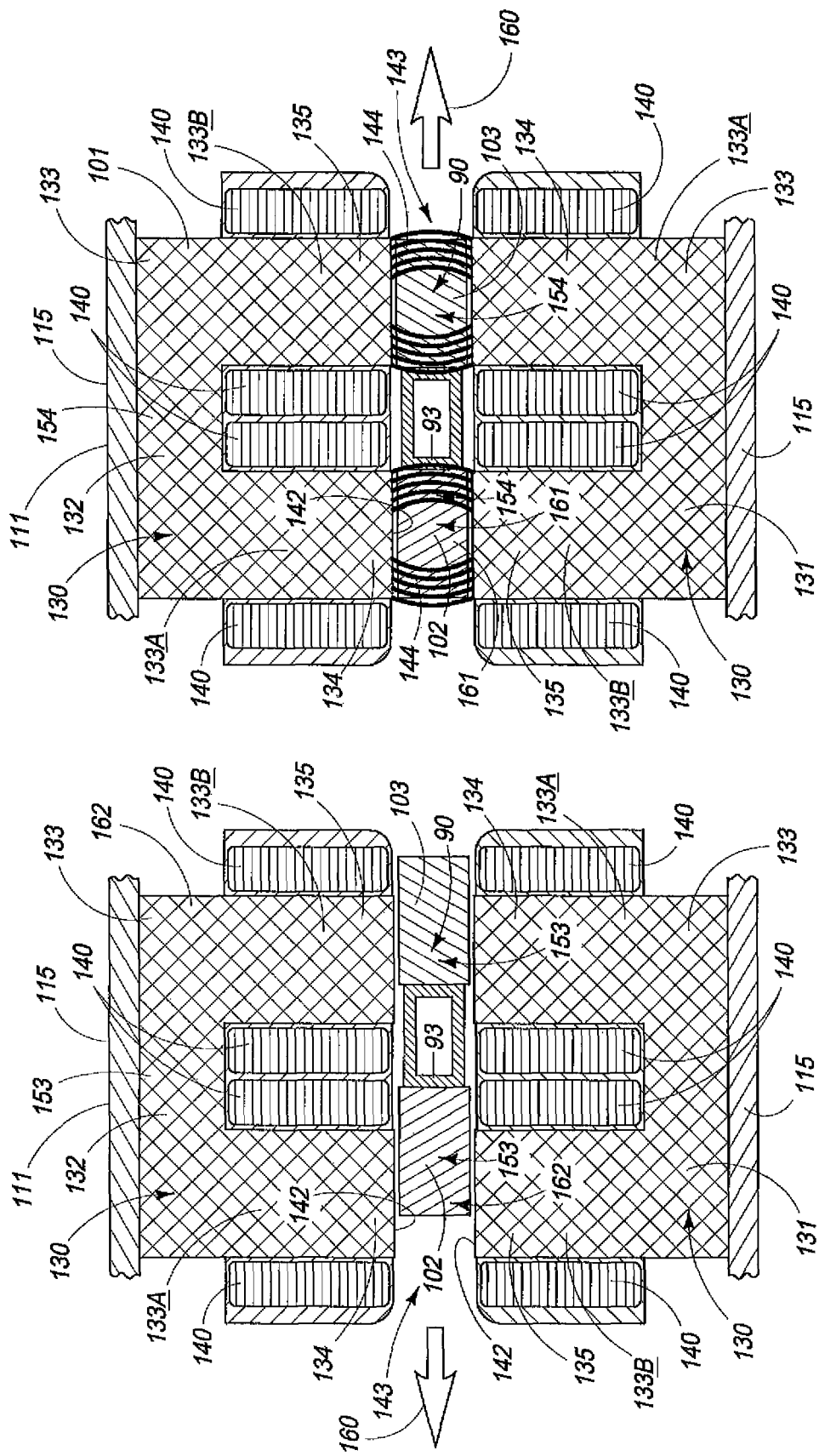

VIBRATORY CONVEYOR

TECHNICAL FIELD

The present invention relates to a vibratory conveyor, and more specifically to a vibratory conveyor employing a conveyor bed driving assembly which can be readily energized in a fashion so as to avoid detrimental motion of the vibratory conveyor bed during the start-up, and the shut-down of the vibratory conveyor.

BACKGROUND OF THE INVENTION

Vibratory conveyors, and especially excited frame vibratory conveyors have been employed in a wide variety of industry segments for a number of decades. Excited frame vibratory conveyors have a significant presence in the food processing industry and where such conveyors have been utilized to handle fragile food products such as potato chips, coated food products, and the like. As should be understood excited frame conveyors avoid the problems associated with other conveyors which cause adverse, and undesirable movement or tumbling of the food products. This type of movement causes damage to the food product or the loss of food coatings that have been deposited on the food products.

While vibratory conveyors of the type described, above have found wide-spread acceptance, and use, in assorted industry segments, those industries employing excited frame conveyors have long known about environments where such devices have had performance problems which have detracted from their usefulness. For example, those skilled in the art have long recognized that various problems arise when excited frame conveyors are deployed which have extremely long vibratory bed lengths. When such excited frame conveyors are employed, difficulties are often encountered in starting (energizing), and stopping (de-energizing) such vibratory conveyors because such long vibratory conveyor beds often tend to move in somewhat erratic fashions as the vibratory conveyor bed moves or accelerates through various resonant vibratory frequencies during the ramping-up (accelerating) and the ramping-down of the vibratory speed of the conveyor bed. This adverse movement may include, but is not limited to, side-to-side motion, and/or up and down motion, which can cause a needless amount of stress, strain and twisting motion which is imparted to the elongated conveyor springs that are employed to support the vibratory conveyor bed while it is in motion.

While various methodology and arrangements have been developed through the years, to avoid the adverse movement normally expected in longer length excited frame conveyor beds, designers of such machines have looked for other means for reducing or eliminating the adverse movement of these longer conveyor beds in order to provide greater reliability and decreased maintenance costs for excited frame conveyor beds of this type of design.

The present invention provides a vibratory conveyor which avoids the detriments associated with the prior art devices and practices utilized heretofore by employing a novel conveyor bed driving assembly which substantially eliminates the problems associated with the ramping-up (energizing) and the ramping-down (de-energizing) of the vibratory conveyor bed during routine operations.

SUMMARY OF THE INVENTION

A first aspect of the present invention relates to a vibratory conveyor which includes a base frame which is positioned on a supporting surface; a reciprocally moveable conveyor bed for supporting a product for movement along the reciprocally moveable conveyor bed; a first multiplicity of elongated springs which are mounted on the base frame, and which resiliently support the reciprocally moveable conveyor bed in spaced relation relative to the base frame; and a conveyor bed driving assembly mounted on the base frame, and wherein the conveyor bed driving assembly has a non-moveable support member which is mounted on the base frame, and a reciprocally moveable driver which is biasingly supported on the non-moveable support member, and which further, when selectively energized, magnetically cooperates with the non-moveable support member so as to impart movement of the reciprocally moveable driver along a given path of travel, and simultaneously generates a physical force which is directed along a line of reference which passes through the reciprocally moveable conveyor bed, and is effective in causing reciprocal motion of the reciprocally moveable conveyor bed.

Still another aspect of the present invention relates to a vibratory conveyor which includes a base frame which is positioned on a supporting surface, and which further has opposite first and second ends, and wherein the base frame is further defined, at least in part, by a longitudinal axis; a first multiplicity of elongated springs which each have a first end, which are individually mounted on the base frame, and an opposite, resiliently moveable second end, and wherein the first multiplicity of elongated springs are mounted in predetermined, spaced relation, one relative to the others; a reciprocally moveable conveyor bed for supporting a product for movement along the reciprocally moveable conveyor bed, and wherein the reciprocally moveable conveyor bed has a first, product intake end, and an opposite, second, product discharge end, and wherein the second end of each of the first multiplicity of elongated springs is mounted on the reciprocally moveable conveyor bed, and wherein the first multiplicity of elongated springs positions the reciprocally moveable conveyor bed in predetermined, spaced relation relative to the base frame, and wherein the reciprocally moveable conveyor bed is further carried along a reciprocal first path of travel by the first plurality of elongated springs, and wherein the first path of travel is defined, at least in part, by a first course of travel, and where the reciprocally moveable conveyor bed, in the first course of travel, moves in a longitudinally, forward direction, and a second course of travel, and where the reciprocally moveable conveyor bed, in the second course of travel, moves in an opposite, longitudinally, rearward direction; a conveyor bed driving assembly which is mounted on the base frame, and which is further located between the first, and second ends of base frame, and wherein the conveyor bed driving assembly includes a transversely disposed, non-moveable support member which is mounted on the base frame, and wherein the conveyor bed driving assembly further has a second multiplicity of elongated springs which each have a first end that are individually mounted on the transversely disposed, non-moveable support member, and an opposite, resiliently moveable second end, and wherein the conveyor bed driving assembly further has a reciprocally moveable driver housing which is mounted on the second end of the second multiplicity of elongated springs, and which further defines an internal cavity, and wherein the conveyor bed driving assembly further has a pair of selectively energizable electromagnets which are mounted within the internal cavity of the reciprocally moveable driver housing, and which are further oriented in predetermined spaced relation, one relative to the other, and wherein a gap of predetermined dimensions is defined between the respective electromagnets, and wherein the conveyor bed driving assembly further has a driving assembly coupler which is mounted on the non-moveable support member, and which is further sized so as to be received within the gap, and disposed in spaced relation relative to each of the respective selectively energizable electromagnets, and wherein the respective electromagnets, when energized. magnetically interacts with the driving assembly coupler in a manner so as to propel the driver housing along a second path of travel to a first, forward position, and which simultaneously, and resiliently bends the second multiplicity of elongated springs which are mounted on the conveyor bed driving assembly, and wherein the propulsion of the driver housing to the first, forward position generates a physical force which is directed toward the reciprocally moveable conveyor bed, and which further, simultaneously, causes the reciprocally moveable conveyor bed to move along the second course of the first path of travel of the reciprocally moveable conveyor bed, and which is in a longitudinal, rearward direction, and wherein movement of the reciprocally moveable conveyor bed along the second course of travel resiliently bends the respective first multiplicity of elongated springs which resiliently support the reciprocally moveable conveyor bed on the base frame, and wherein the respective electromagnets, when de-energized, allows the previous, resiliently bent, second multiplicity of elongated springs to propel the driver housing along the second path of travel to a second, rearward position, and wherein movement of the driver housing to the second, rearward position causes the previously bent, first multiplicity of elongated springs to propel the reciprocally moveable conveyor bed along the first course of travel of the reciprocally moveable conveyor bed in a longitudinally forward direction; and a controller electrically coupled with the respective selectively energizable electromagnets, and which selectively electrically energizes the respective electromagnets so as to cause a predetermined reciprocal motion of the conveyor bed, and which facilitates the movement of the product from the first to the second end of the reciprocally moveable conveyor bed.

These and other aspects of the present invention will be described in greater detail hereinafter.

BRIEF DESCRIPTION OF THE DRAWINGS

Preferred embodiments of the invention are described, below, with reference to the following accompanying drawings.

FIG. 18A is a greatly simplified, transverse sectional view taken through the conveyor bed driving assembly of the present invention during a first phase of operation.

FIG. 18B is a greatly simplified, transverse sectional view taken through the conveyor bed driving assembly of the present invention during a second phase of operation.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
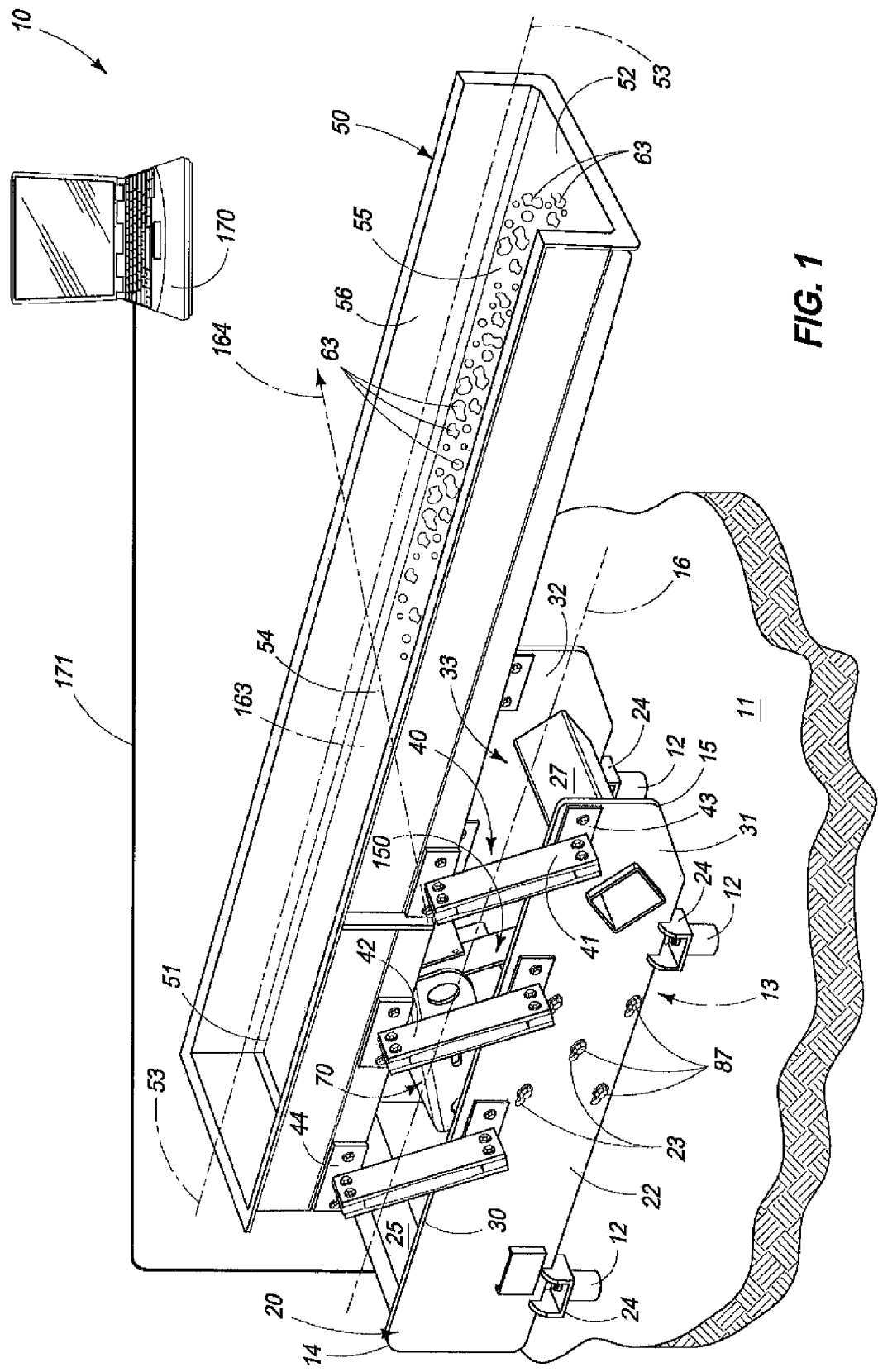
FIG. 1 is a perspective, side elevation view of the vibratory conveyor of the present invention.

A vibratory conveyor, which is fabricated in accordance with the teachings of the present invention, is generally indicated by the numeral 10 in FIG. 1 and following. While the invention as illustrated, and disclosed, hereinafter employs a single conveyor bed driving assembly, it should be understood that the teachings of the present invention could be employed to fabricate vibratory conveyor assemblies which utilize two or more conveyor bed driving assemblies as described in the paragraphs which follow. As seen in FIG. 1, for example, the vibratory conveyor 10 is illustrated in an orientation where it is located on an underlying supporting surface 11. However, it will be readily recognized that for excited frame vibratory conveyors of this design, these same machines may be suspended from an overhead supporting surface (not shown) in a manner well known in the art. The vibratory conveyor 10 as seen in FIG. 1 is positioned on an underlying supporting surface such as a factory floor 11, and is held in spaced relation thereto by a plurality of legs which are generally indicated by the numeral 12. The plurality of legs are located on the supporting surface 11 and extend upwardly therefrom, and support the invention 10 in spaced relation relative to the supporting surface 11. The invention further includes a base frame which is generally indicated by the numeral 13. The base frame 13 has a first end 14, and an opposite, second end 15.

As seen in FIG. 1 and following, the vibratory conveyor 10 includes, as noted above, a base frame 13, and which is formed of a pair of frame members 20, here indicated as a first frame member 21, and a second frame member 22. The pair of frame members 21 and 22 are disposed in predetermined, spaced, substantially parallel relation. The respective frame members 21 and 22 each have formed therein a multiplicity of elongated apertures 23 which are utilized for mounting a support member which will be discussed in greater detail, hereinafter. Still further, each of the respective frame members 21 and 22 mount leg engagement fixtures which are generally indicated by the numeral 24. As should be understood, the respective legs 12 are operable to be attached by means of conventional fasteners, to the leg engagement fixtures 24. Still further, the base frame 13 includes a housing 25 which is positioned near the first end 14 thereof.

Figure 5:
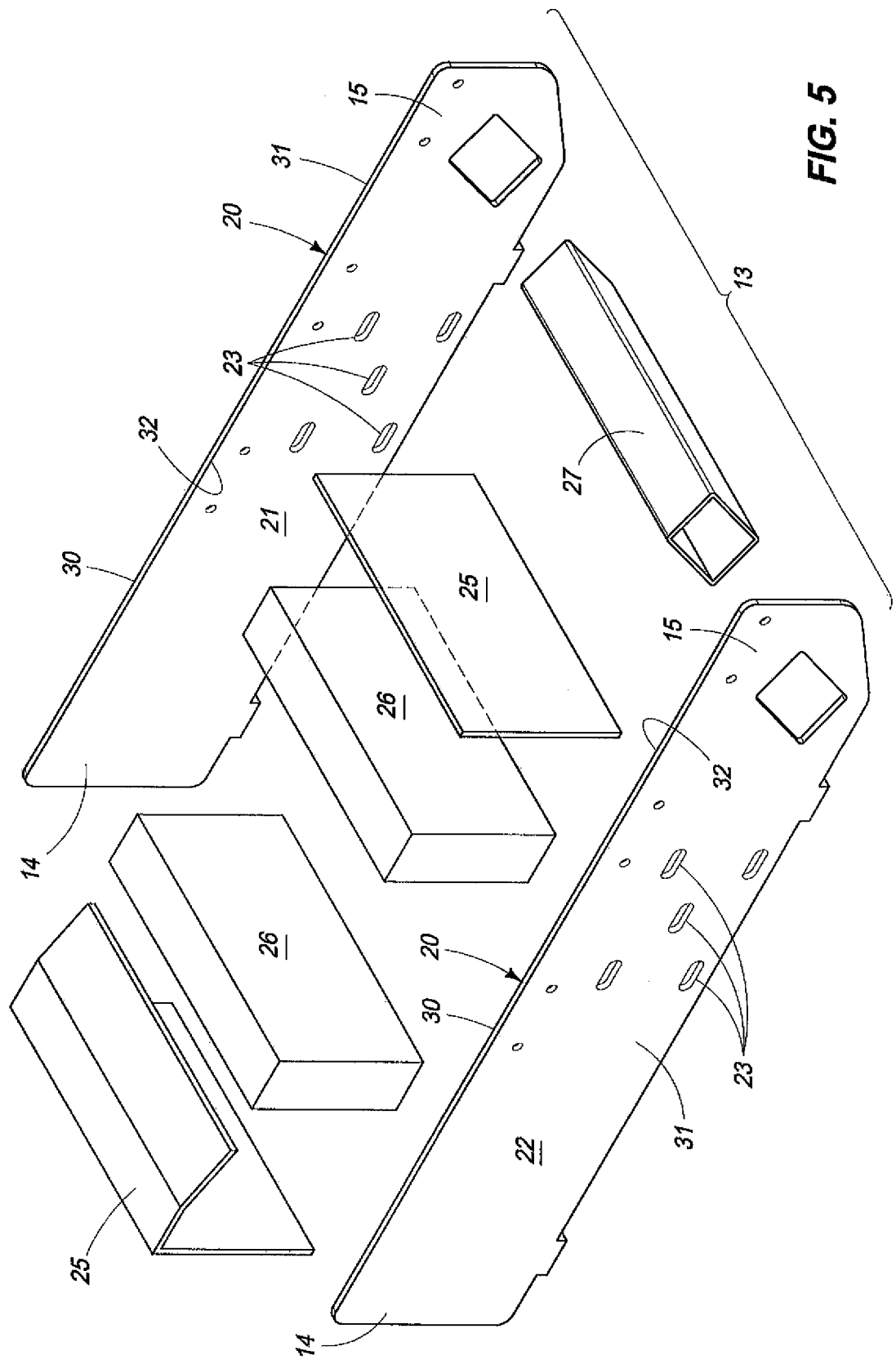
FIG. 5 is a perspective, exploded, side elevation view of the base frame as seen in FIG. 4.
Figure 6:
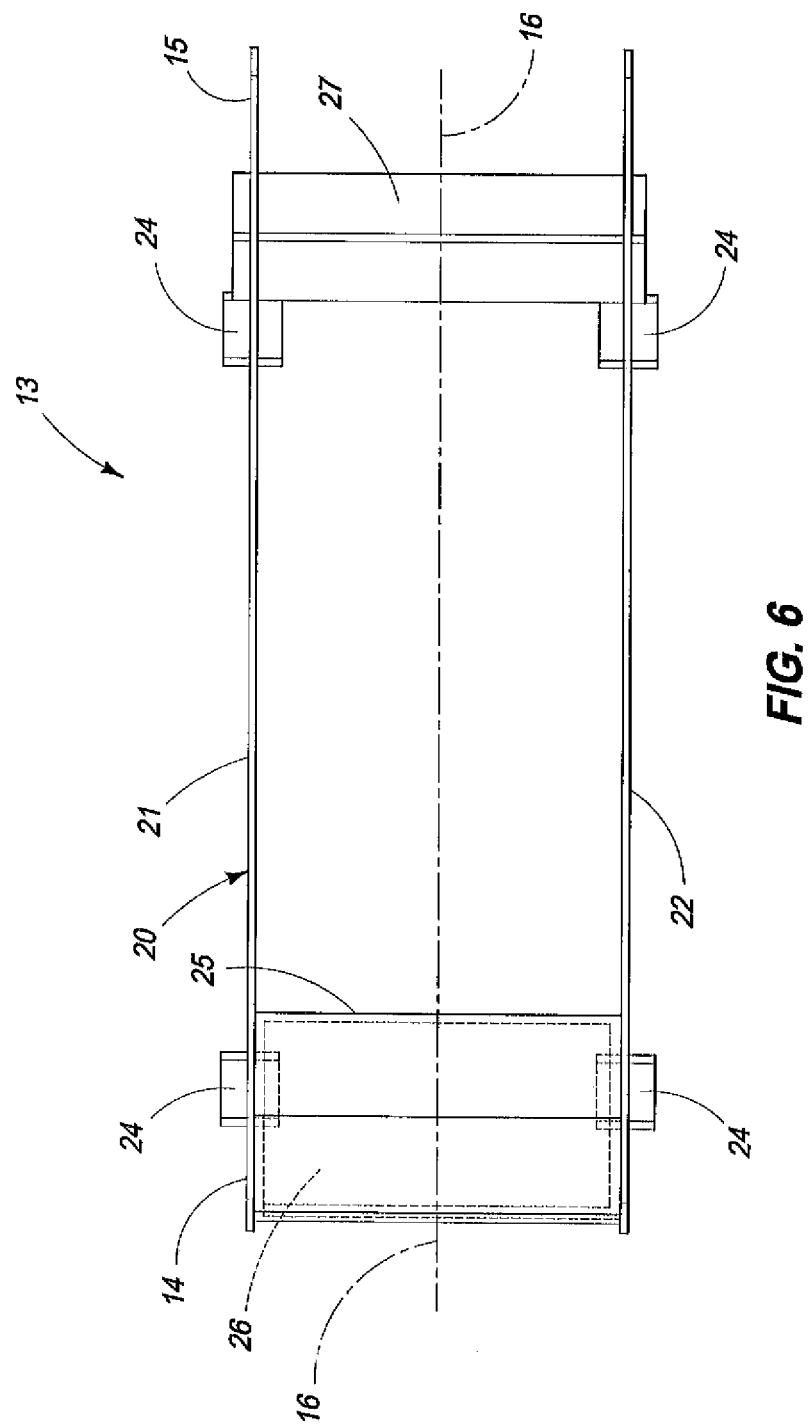
FIG. 6 is a top plan view of the base frame as seen in FIG. 4.

Referring now to FIG. 5, the housing 25 encloses a weighted base frame mass 26. The weighted base frame mass is enclosed within the housing 25. Still further, the first and second frame members 21 and 22, respectively, and which are disposed in predetermined spaced relation, are held in a parallel orientation by a transverse reinforcing beam 27, and which is mounted near the second end 15 of the base frame 13. While the base frame mass 26 is shown in an orientation at the first end 14, of the base frame 13, it is possible to construct a base frame 13, and where the mass 26 is mounted in other locations on the base frame 13.

The base frame 13, and more specifically the first and second frame members 21 and 22 thereof each have a top peripheral edge 30 as seen in the drawings. Still further, the respective first and second frame members 21 and 22 have an outside facing surface 31, and an opposite inside facing surface 32. A cavity 33 is defined between the first and second frame members 21 and 22, and is operable to receive a conveyor bed driving assembly as will be described in greater detail hereinafter. As will be recognized in the drawings, the vibratory conveyor bed 10 includes a first multiplicity of elongated springs, and which are generally indicated by the numeral 40. The first multiplicity of elongated springs have a first end 41 which are attached on the outside facing surface 31 of each of the first and second frame members 21 and 22, respectively, and an opposite distal, and resiliently moveable second end 42. As seen in the drawings, the first end 41 is affixed by a lower mounting bracket or fixture 43 to the outside facing surface 31 of the respective first and second frame members 21 and 22, respectively. This lower mounting bracket or fixture 43 is positioned in predetermined spaced relation along, and near the top peripheral edge 30 of the first and second frame members 21 and 22. Yet further, the respective first multiplicity of elongated springs 40 each have an upper mounting fixture 44 which is affixed to the second end 42 of the elongated springs 40. The upper mounting bracket 44 is affixed to a reciprocally moveable conveyor bed 50 as will be described in the paragraphs which follow.

Figure 2:
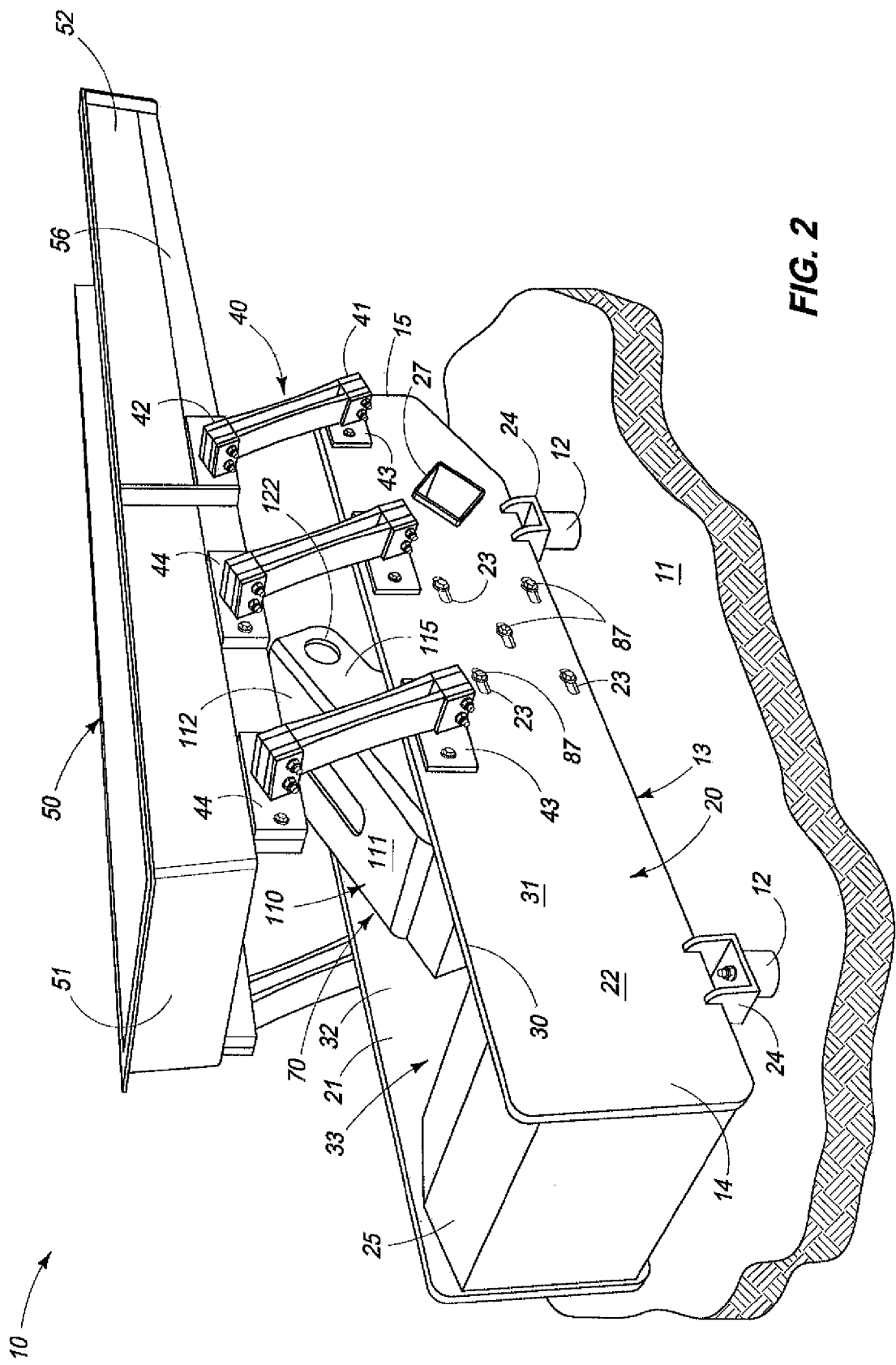
FIG. 2 is a second, perspective, side elevation view of the vibratory conveyor of the present invention.
Figure 2A:
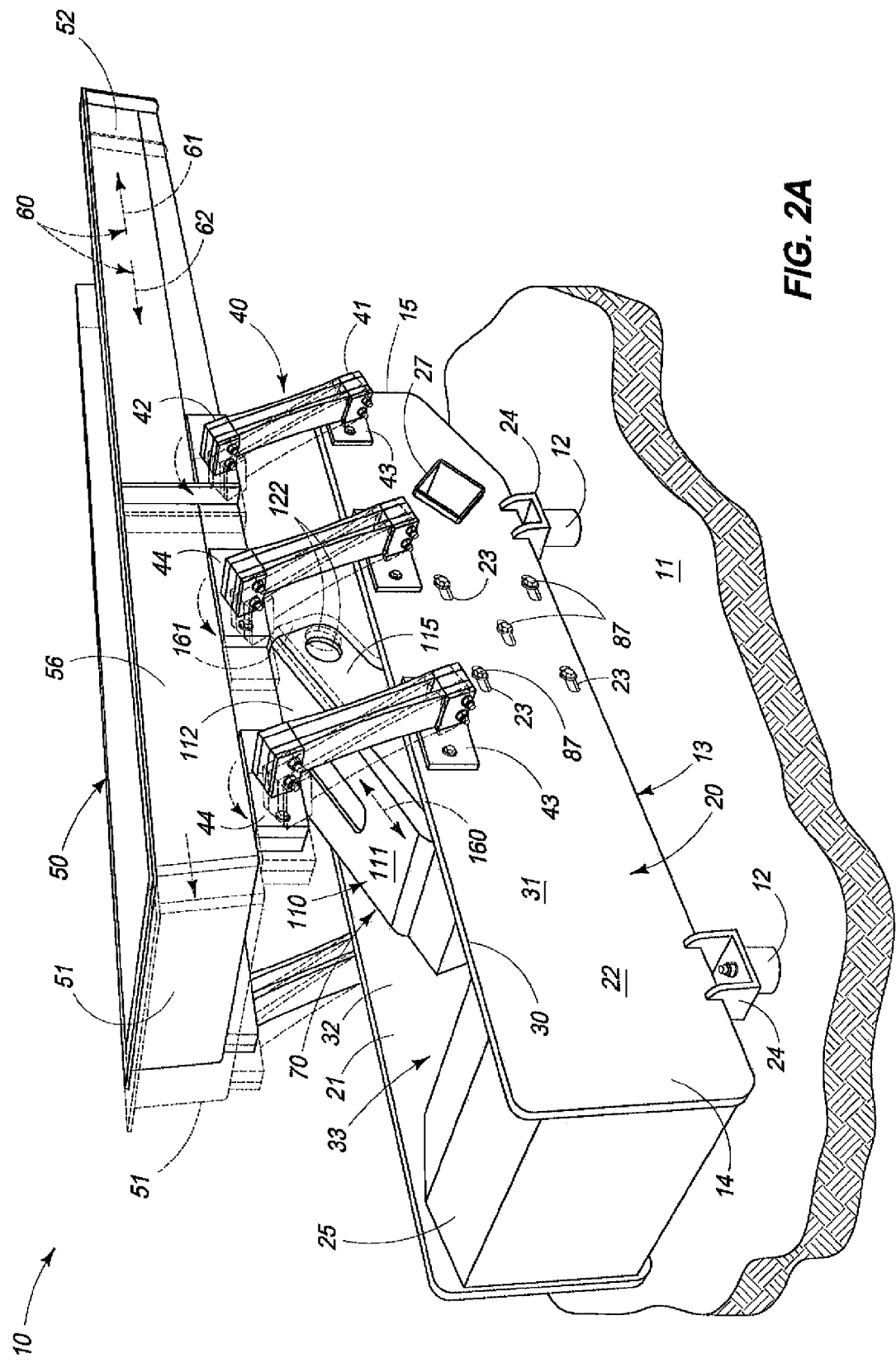
FIG. 2A shows a perspective, side elevation view of the vibratory conveyor as seen in FIG. 2 during a first phase of the operation of the conveyor bed driving assembly as will be described, below.
Figure 2B:
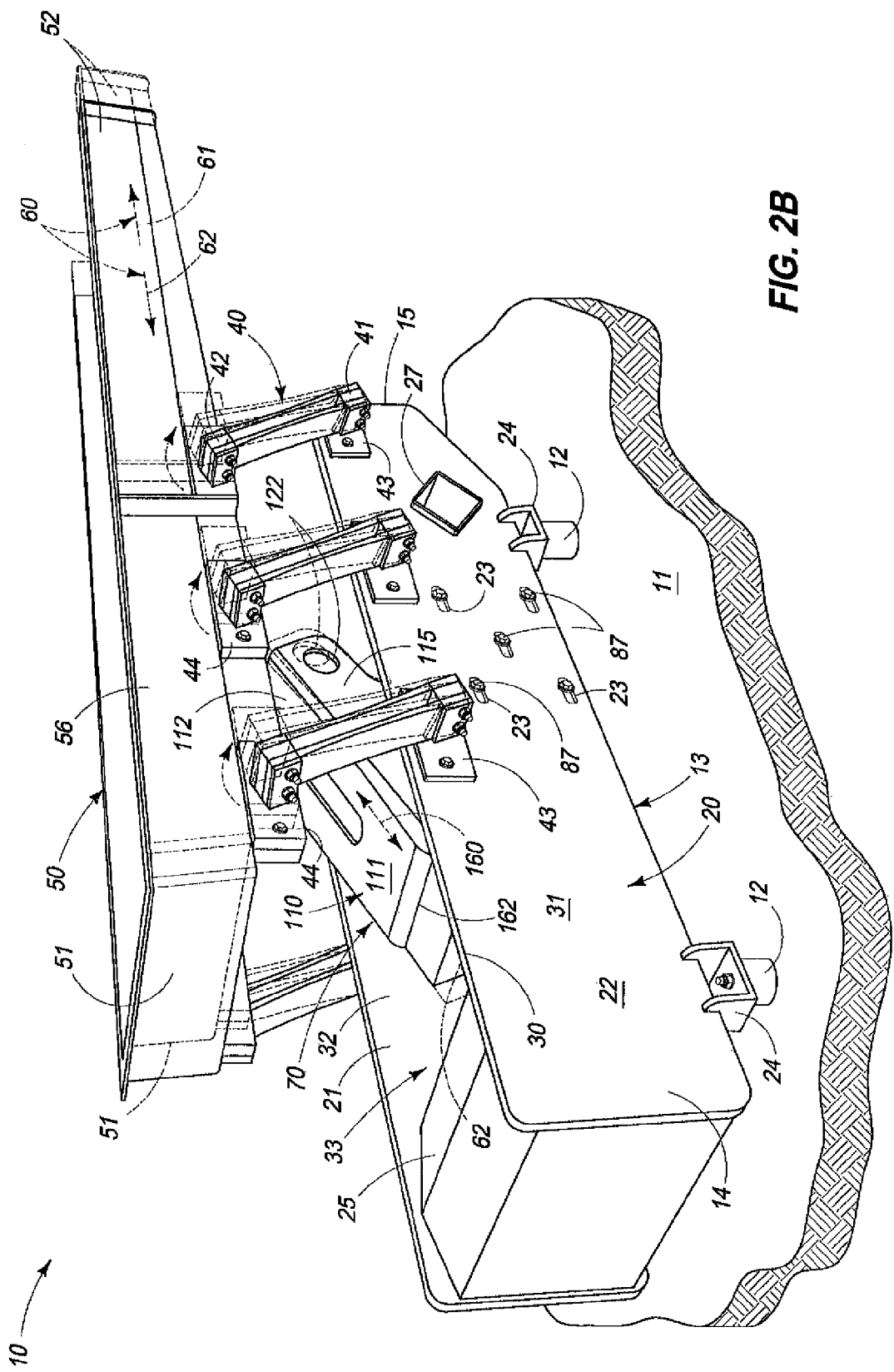
FIG. 2B is a second, perspective, side elevation view of the vibratory conveyor as seen in FIG. 2 and which is shown during a second phase of the operation of the conveyor bed driving assembly as will be described, below.
Figure 3:
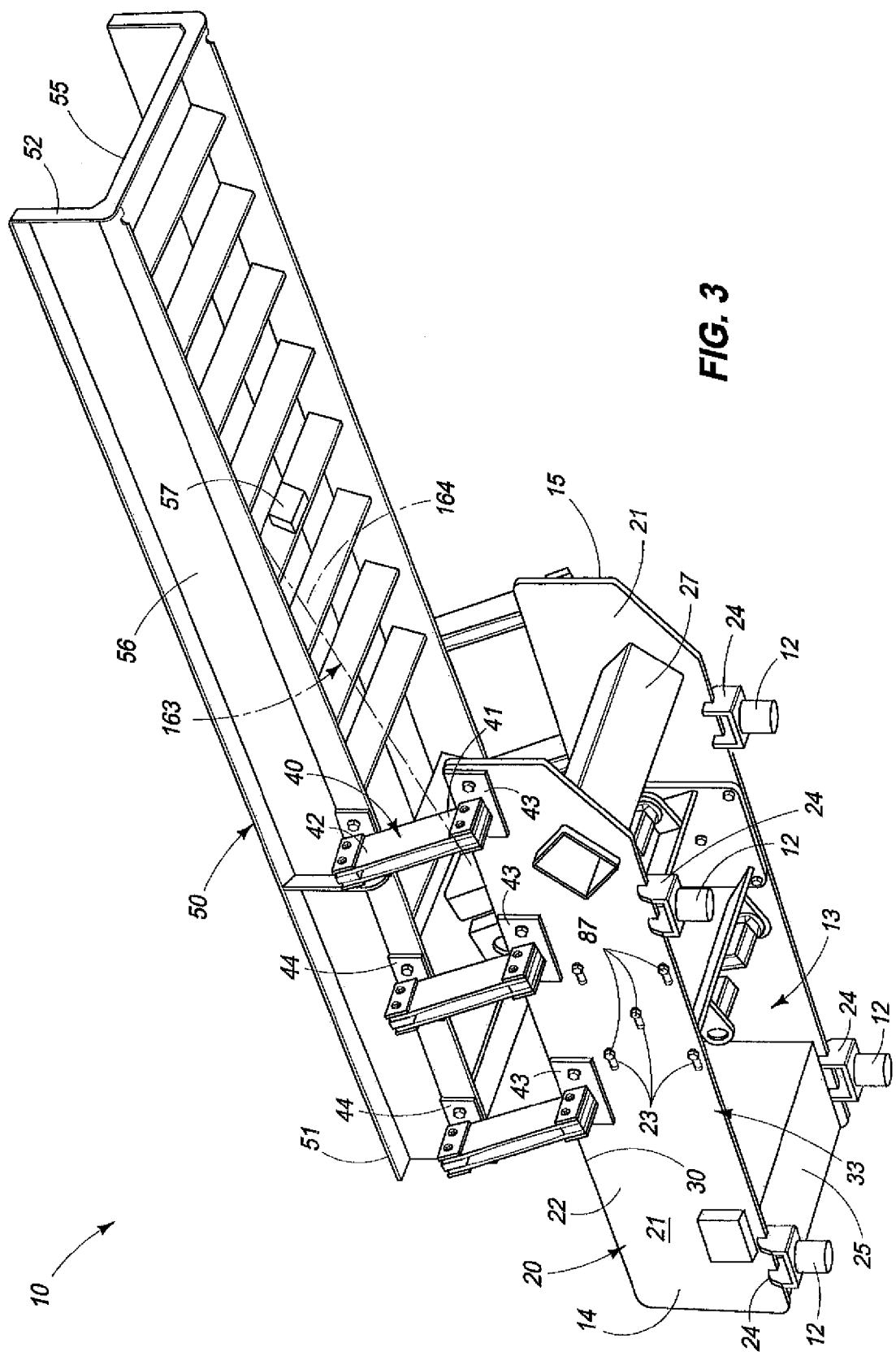
FIG. 3 is a perspective, bottom, side elevation view of the vibratory conveyor of the present invention.
Figure 4:
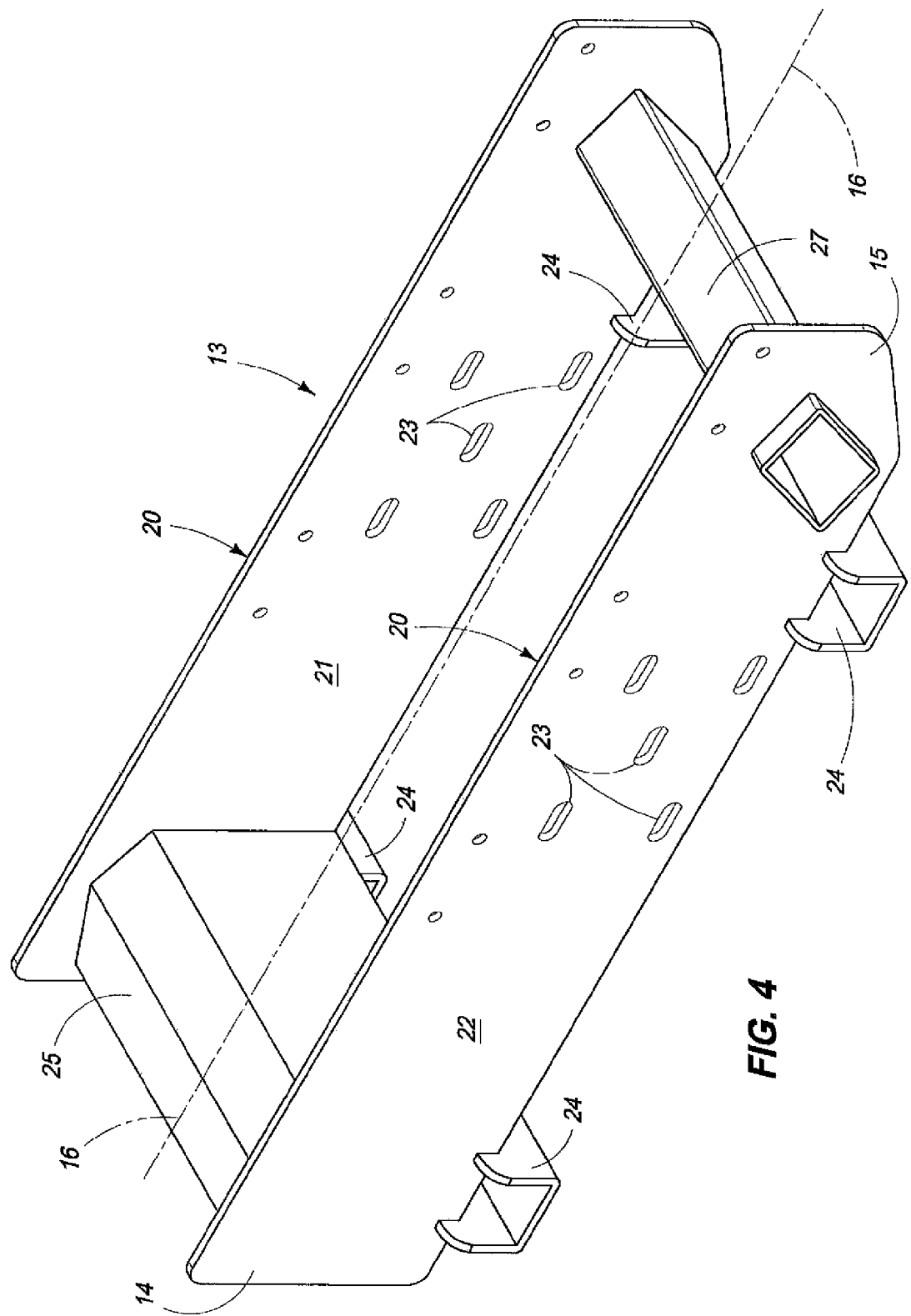
FIG. 4 is a partial, fragmentary, perspective, side elevation view of a base frame which forms a feature of the present invention.

A reciprocally moveable conveyor bed is generally indicated by the numeral 50, and is supported in predetermined, spaced relation relative to the base frame 13 by the first multiplicity of elongated springs 40 as illustrated in FIG. 1, and following. In this regard, the reciprocally moveable conveyor bed 50 is employed for supporting a product for movement along the reciprocally moveable conveyor bed 50. As seen in the drawings, the reciprocally moveable conveyor bed 50 has a first product intake end 51 and a second or product discharge end 52. Still further, the reciprocally moveable conveyor bed 50 is defined, at least in part, by a longitudinal line of reference 53. Still further, the reciprocally moveable conveyor bed 50 has a predetermined weight, and a center of mass which is indicated by the numeral 54. The reciprocally moveable conveyor bed 50 has a product conveying surface 55 which supports the product for movement between the first and second ends 51 and 52 thereof. Still further, the product is confined on the product conveying surface 55 by a pair of laterally disposed and spaced sidewalls 56. As seen in FIG. 3, an accelerometer of conventional design is affixed to the conveyor bed 50, and is further electrically coupled to a controller as will be described, hereinafter. As seen in the drawings, the upper mounting bracket 44 attaches the second end 42 of the respective first multiplicity of elongated springs 40 to the sidewalls 56 as illustrated. As should be understood, the reciprocally moveable conveyor bed 50 is carried along a reciprocal first path of travel 60 (FIG. 2A) by the first plurality of elongated springs 40. The first path of travel is defined, at least in part, by a first course of travel 61, and where the reciprocally moveable conveyor bed 50 moves in a longitudinally forward direction, and a second course of travel 62, and where the reciprocally moveable conveyor bed 50, in the second course of travel, moves in an opposite, longitudinally rearward direction. Those skilled in the art will recognize that this reciprocal movement of the conveyor bed 50 is effective in moving the product which is here generally depicted by the numeral 63 (FIG. 1) from the first intake end 51 to the second discharge end 52.

Figure 11:
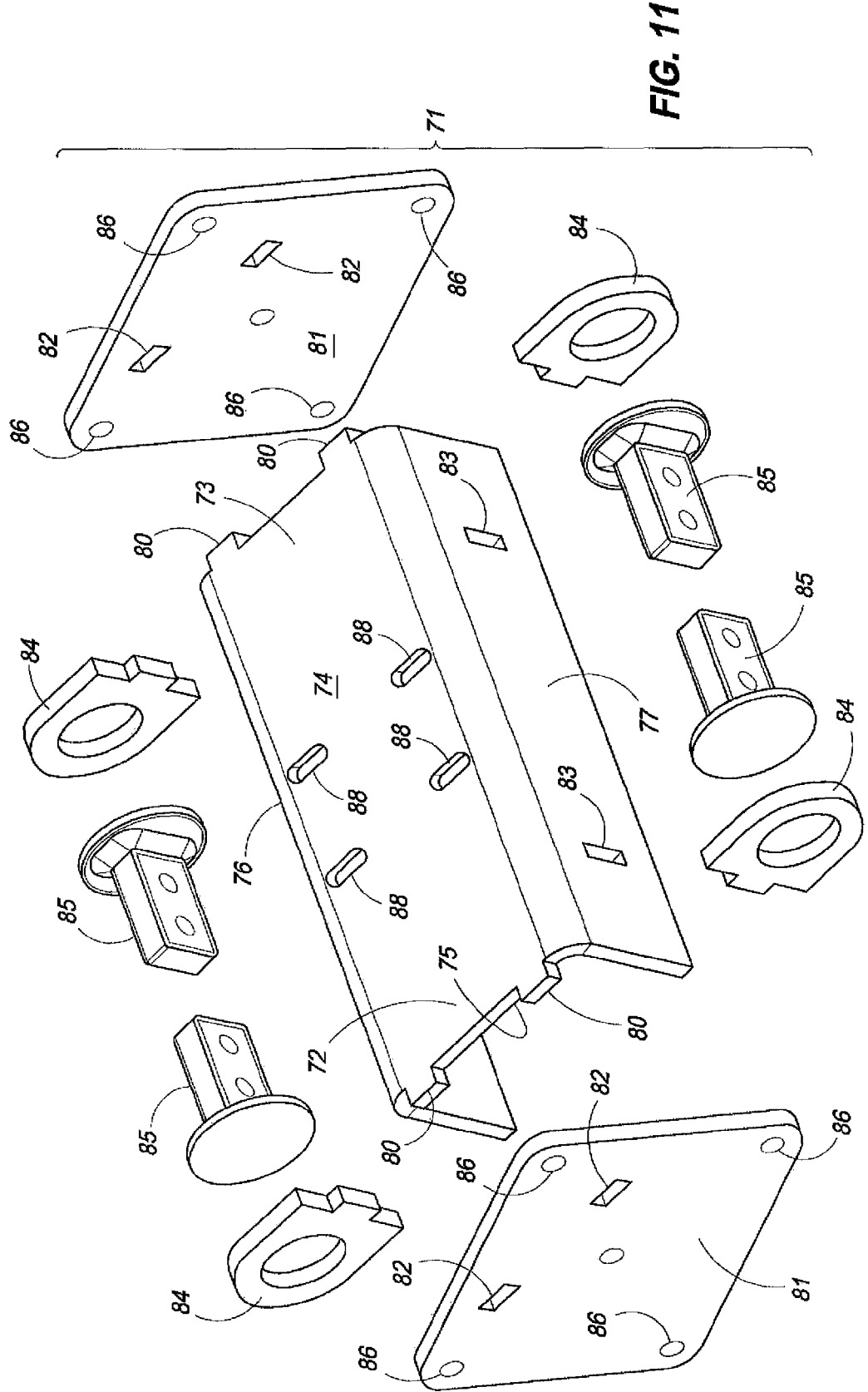
FIG. 11 is a perspective, exploded, second, side elevation view of a non-moveable support member which forms a feature of the present invention.
Figure 12:
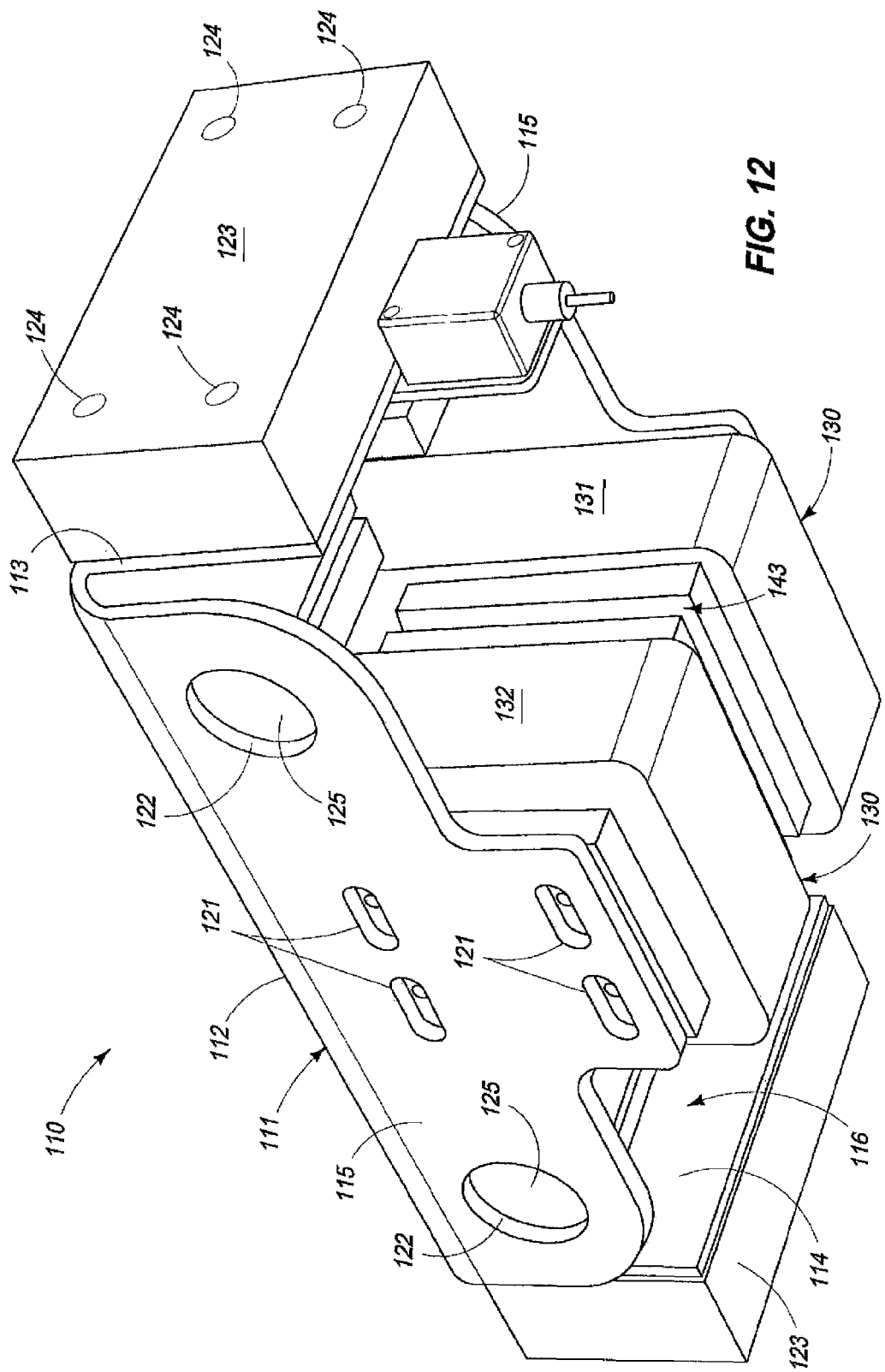
FIG. 12 is a fragmentary, bottom, perspective, side elevation view of a drive frame which forms a feature of the present invention.

The vibratory conveyor 10 of the present invention includes a conveyor bed driving assembly and which is generally indicated by the numeral 70. The conveyor bed driving assembly 70 includes a non-moveable support member which is indicated by the numeral 71 and is as best seen in the exploded view of FIG. 11. The non-moveable support member 71 is received within the cavity 33 as defined between the pair of frame members 20, and which form the base frame 13. The non-moveable support member 71 has a first end 72, and an opposite second end 73. Still further, the non-moveable support member 71 has a top surface 74 and an opposite bottom surface 75. As seen in FIG. 11, the non-moveable support member 71 has a leading peripheral edge 76, and an opposite trailing peripheral edge 77.

Figure 10:
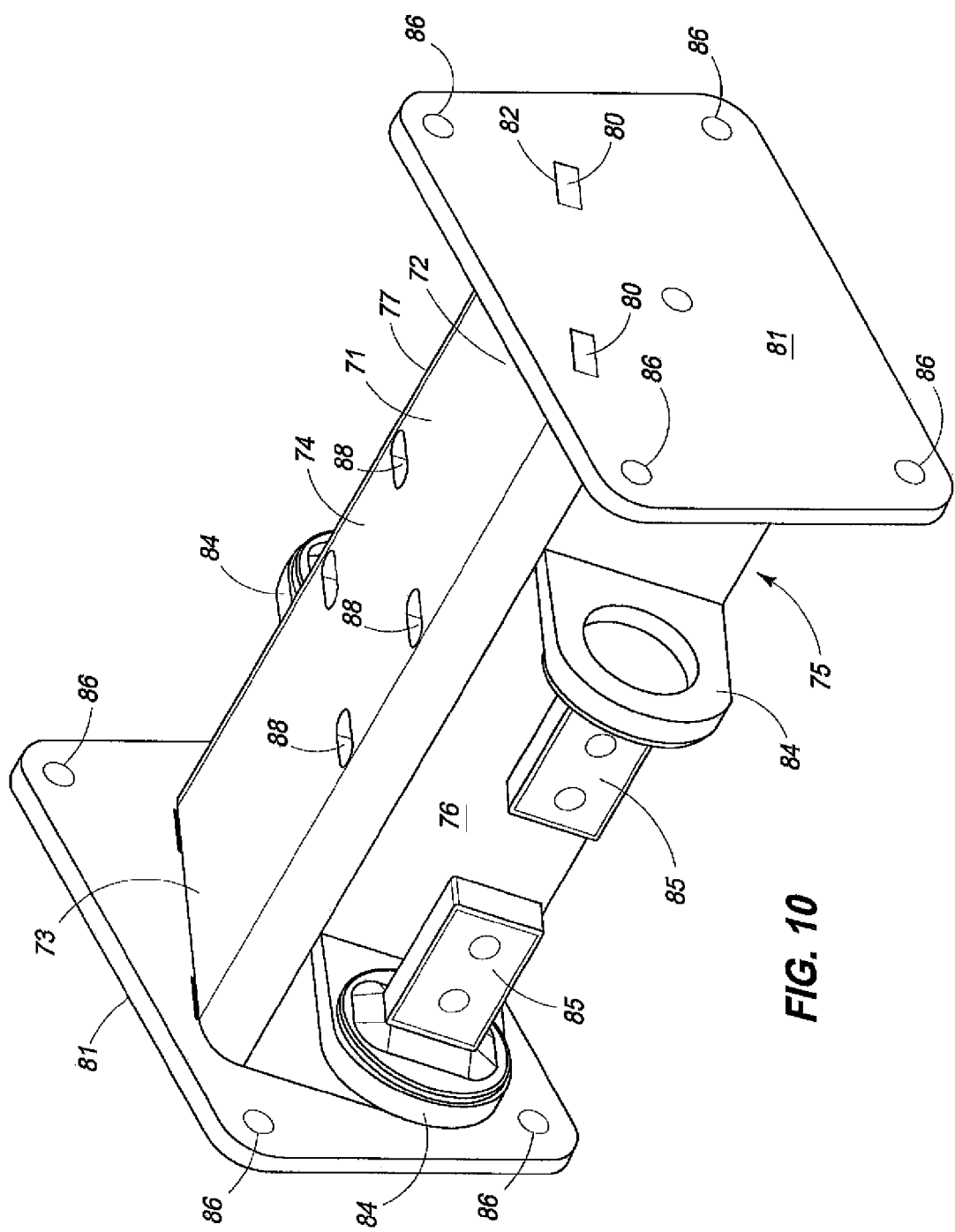
FIG. 10 is fragmentary, perspective, side elevation view of a non-moveable support member which forms a feature of the present invention.

Referring still to FIG. 11, the non-moveable support member 71 which forms a portion of the conveyor bed driving assembly 70 includes pairs of engagement tongues 80 which extend longitudinally outwardly relative to first and second ends 72 and 73 thereof. The pair of engagement tongues 80 are individually operable to matingly couple with individual mounting plates 81 which are positioned on, and mounted to, the first and second ends 72 and 73 of the non-moveable support member 71. The pair of engagement tongues 80 are typically held or fastened in the pair of receiving apertures 82 which are formed in the respective mounting plates 81 by welding or other similar fastening techniques. As will be seen in FIG. 11, a pair of receiving apertures 83 are individually formed in the leading and trailing peripheral edges 76 and 77 of the non-moveable support member 71, and are operable to receive, therein, individual spring bracket bases which are generally indicated by the numeral 84. The individual spring bracket bases 84 are affixed to the leading and trailing edges by welding and other similar fastening techniques. As seen in FIG. 11, individual spring brackets 85 are affixed by welding and the like, to the individual spring bracket bases 84, and provide a location where one end of a second multiplicity of elongated springs may be attached in a manner which will be discussed in greater detail hereinafter. The multiple spring brackets 85 position a driver assembly housing in a particular orientation as will be disclosed below. As seen in the drawings, and more specifically with respect to FIG. 11, multiple fastener apertures 86 are formed in the individual mounting plates 81 and provide a convenient means whereby fasteners 87 may pass therethrough, and then be received through the elongated apertures 23 which are formed in the first and second frame members 21 and 22. By means of these fasteners, the non-moveable support member 71 can be located in an adjustable longitudinally spaced orientation within the cavity 33, and transversely relative to the longitudinal line of reference 53 of the reciprocally moveable conveyor bed 50. As seen in FIG. 10, multiple elongated fastener apertures 88 are formed in the top surface 74 of the non-moveable support member 71.

Figure 14:
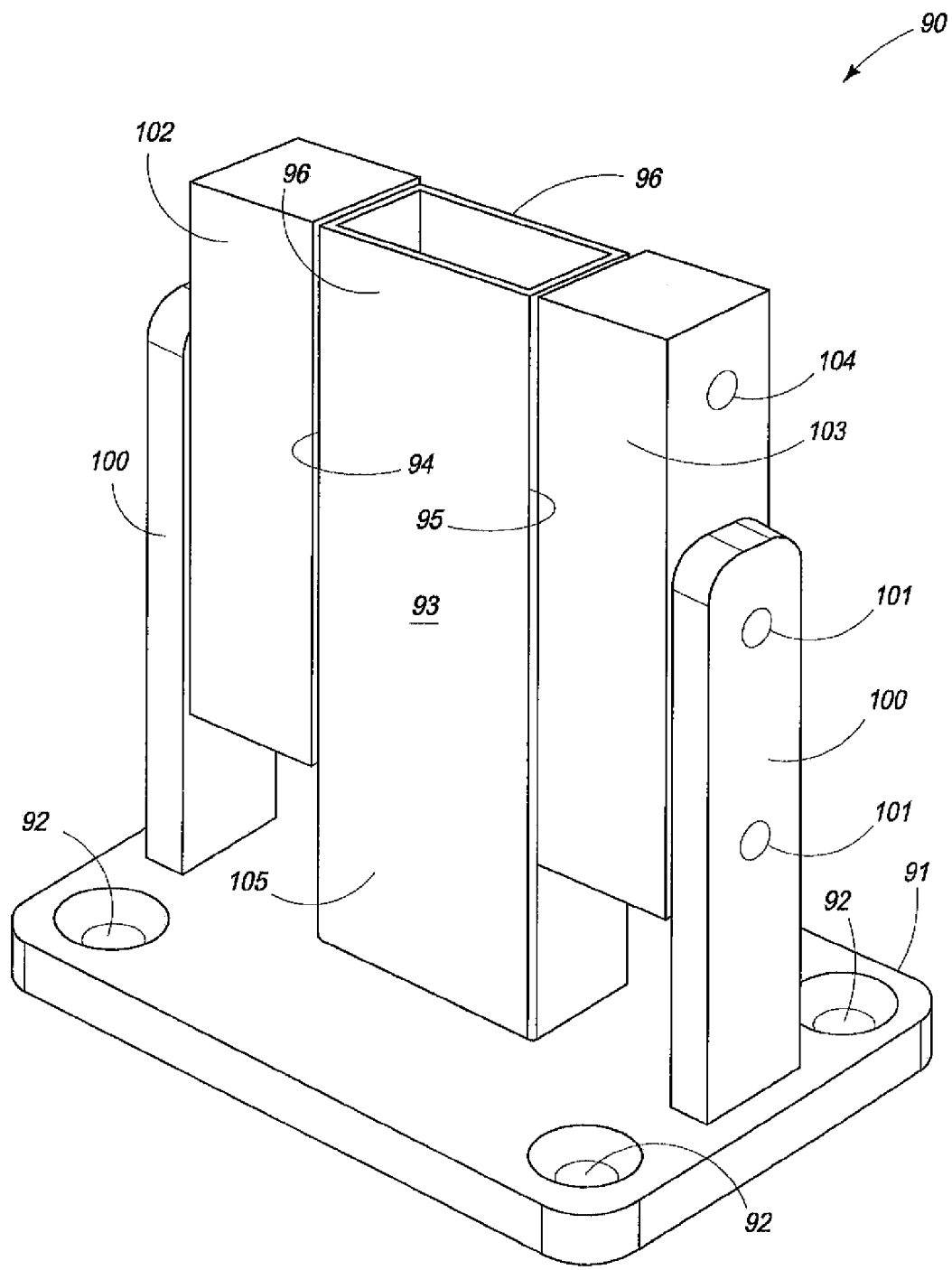
FIG. 14 is a perspective, side elevation view of a driving assembly coupler and which forms a feature of the present invention.
Figure 15:
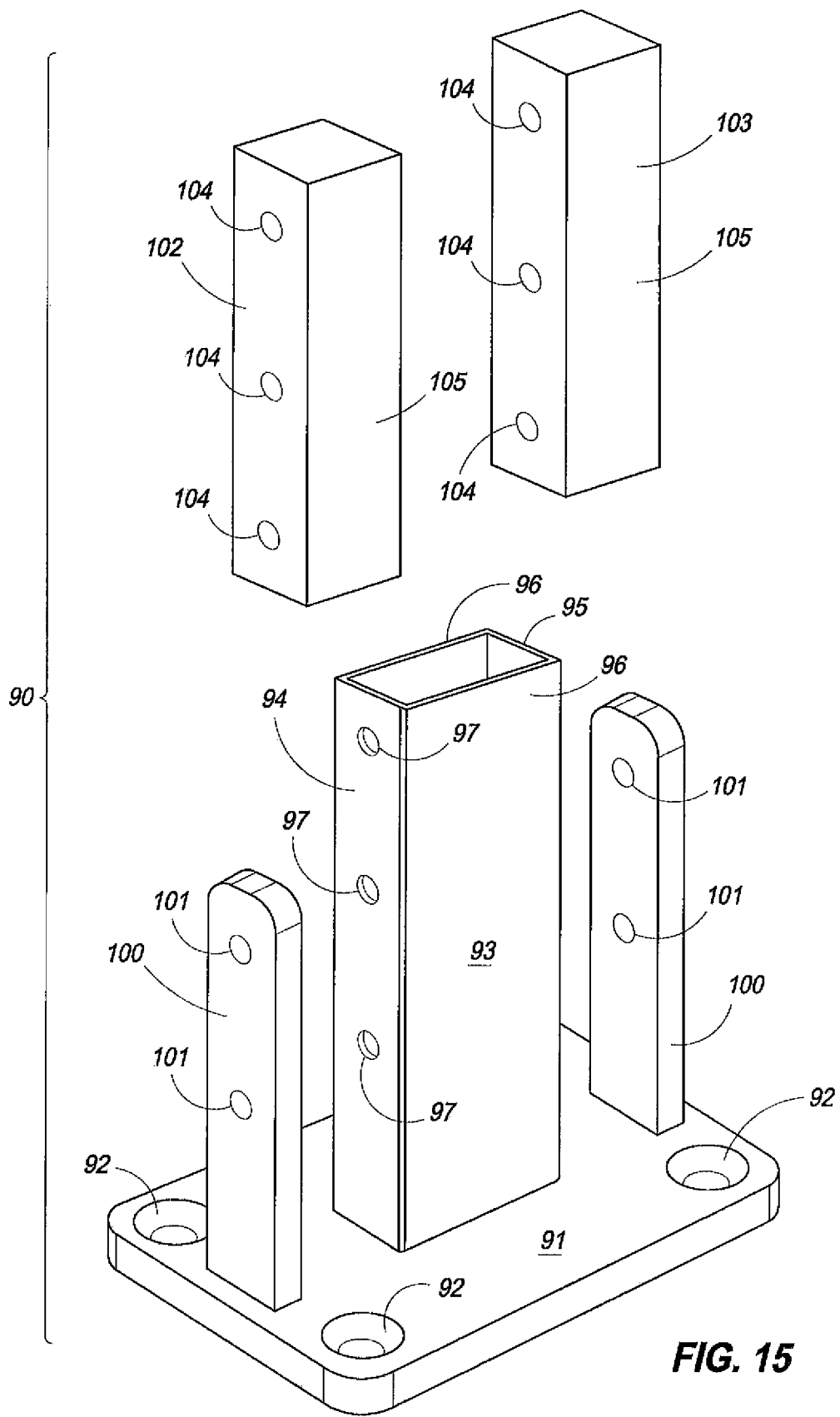
FIG. 15 is a perspective, exploded, side elevation view of a driving assembly coupler which forms a feature of the present invention.
Figure 16:
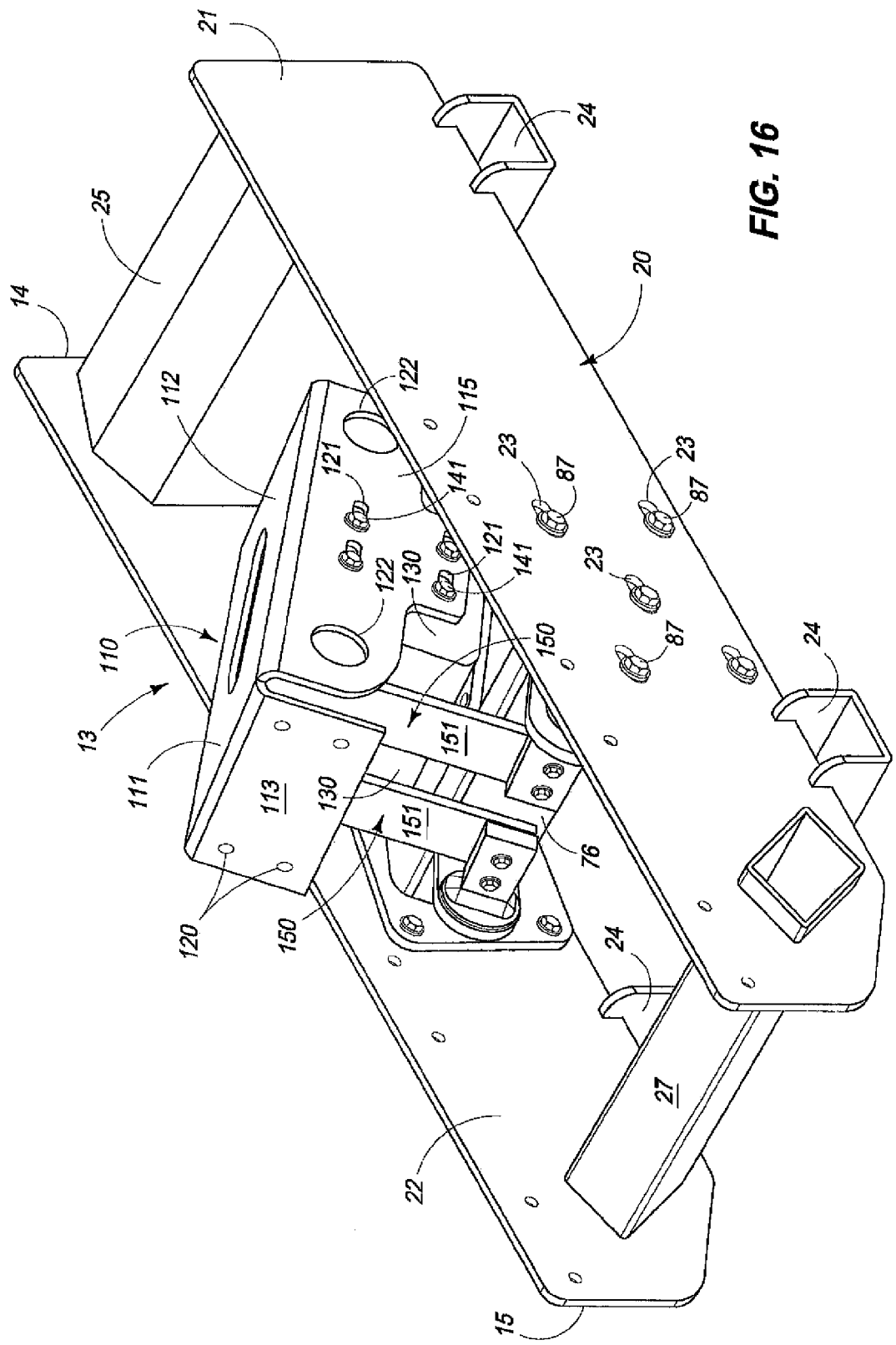
FIG. 16 is a fragmentary, perspective, side elevation view of a base frame mounting a conveyor bed driving assembly, and which forms a feature of the present invention.
Figure 17:
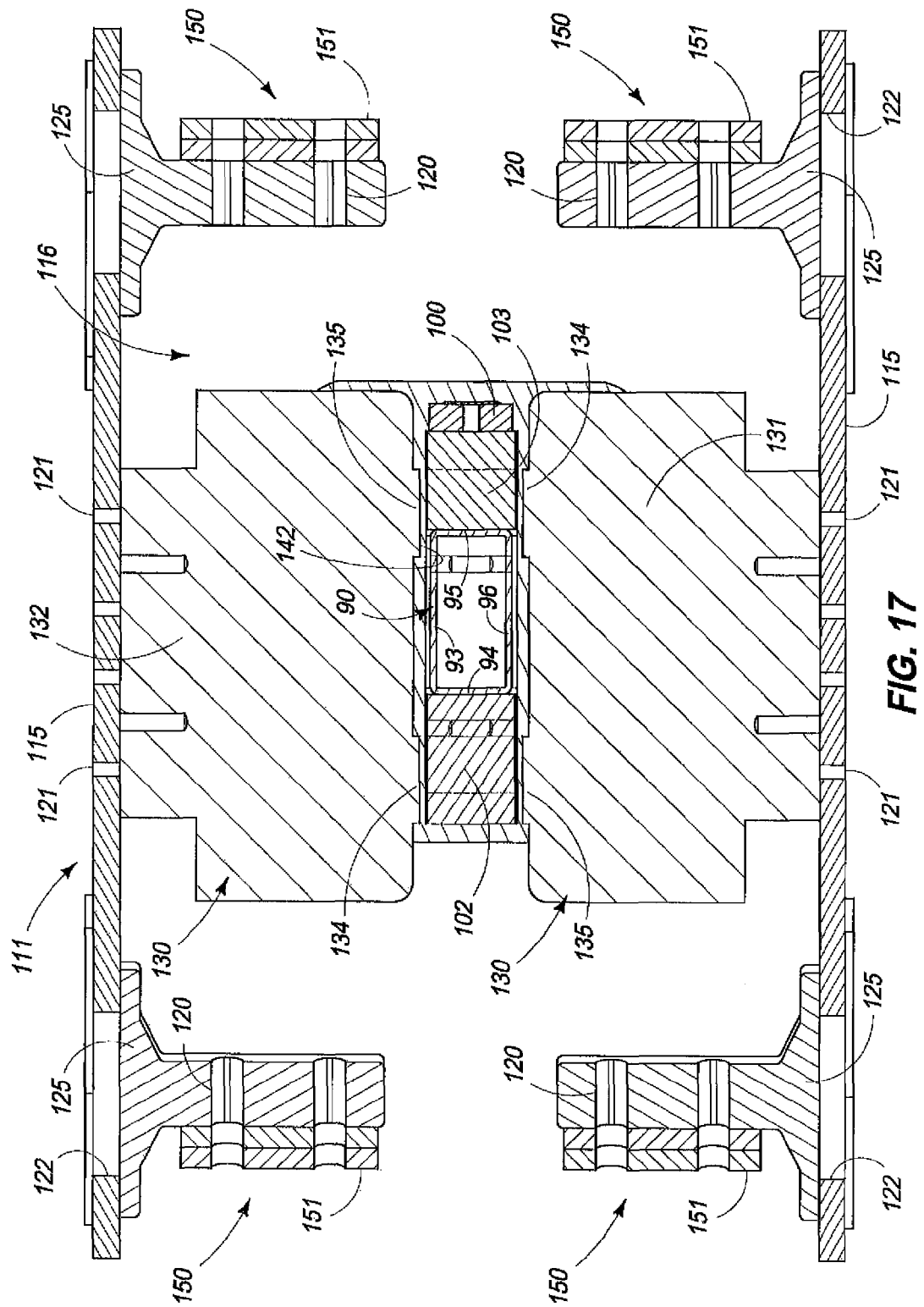
FIG. 17 is a transverse, sectional view taken through the conveyor bed driving assembly as seen in FIG. 16.

Mounted on the top surface 74 of the non-moveable support member 71 is a driving assembly coupler, and which is generally indicated by the numeral 90 in FIGS. 14 and 15, respectively. The driving assembly coupler 90 includes a base plate 91 which has formed therein numerous fastening apertures 92 which are oriented so as to be coaxially aligned relative to the apertures 88 which are formed in the top surface 74 of the non-moveable support member 71. The base plate 91 is then fastened using suitable threaded fasteners (not shown) to the top surface 74 of the non-moveable support member 71. Mounted on and extending normally upwardly relative to the base plate 91 is a central stainless steel support member, and which is generally indicated by the numeral 93. The support member 93 has a leading edge 94, a trailing edge 95, and is further defined by laterally disposed sidewalls 96. The central stainless steel support member 93 has a given transverse dimension as measured between the lateral sidewalls 96 which is dimensioned so as to be received in a gap which is subsequently formed between two electromagnets as will be described in greater detail hereinafter. As seen in FIG. 15, multiple apertures 97 are formed in the leading and trailing edges 94 and 95, and are operable to receive a fastener therethrough. Additionally, as seen in FIGS. 14 and 15, a pair of spaced support members 100, each extend normally, upwardly, relative to the base plate 91. A plurality of apertures 101 are formed in the spaced support member 100, and are substantially coaxially aligned relative to the multiple apertures 97 which are formed in the central stainless steel support member 93. The driving assembly coupler 90 further includes a leading weak iron portion 102; and a trailing stainless steel portion 103 which are positioned in juxtaposed relation relative to the respective leading and trailing edges 94 and 95 of the central stainless steel portion 93. Again, the portions 102 and 103, respectively, have mounting apertures 104 formed therein, and which are substantially coaxially aligned with the apertures 101 and 97, respectively, and which are formed in the adjacent structures. Again, fasteners (not shown) are received through the coaxially aligned apertures so as to secure the leading and trailing stainless steel portions 102 and 103 to the central support member 93. The driving assembly coupler 90 as seen in FIGS. 14 and 15, magnetically cooperates with the driving assembly as will be described, hereinafter, to achieve the benefits of the present invention.

Figure 13:
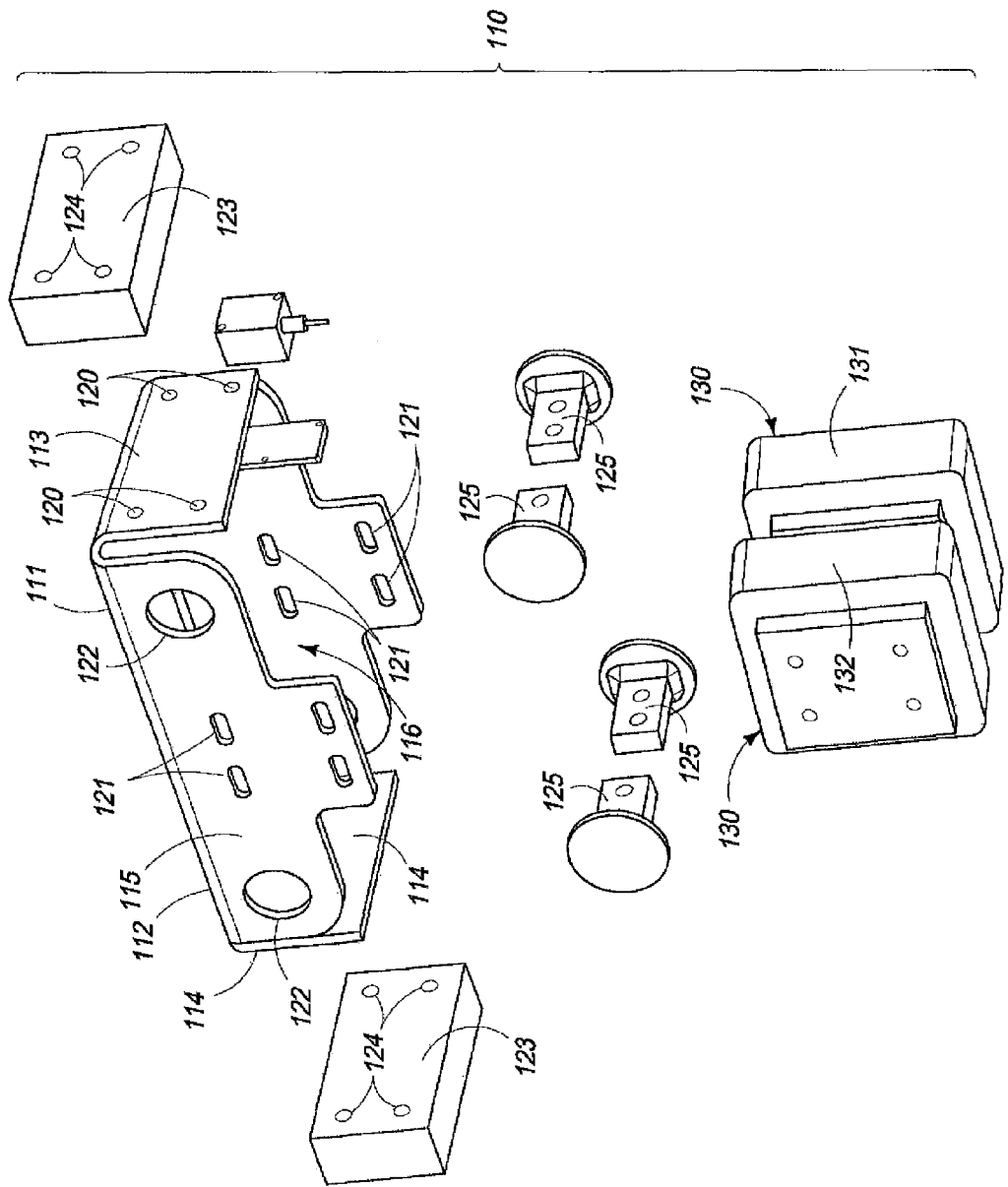
FIG. 13 is a perspective, exploded, side elevation view of a drive frame which forms a feature of the present invention.

The vibratory conveyor 10 includes a first form of a reciprocally moveable driver and which is generally indicated by the numeral 110, and which is further supported for reciprocal movement relative to the non-moveable support member 71, and the driving assembly coupler 90 which were earlier described (FIG. 13). The reciprocally moveable driver 110 includes a housing 111 which encloses several component elements of the reciprocally moveable driver 110. In this regard, the housing 111, has a top surface 112, and which is defined, at least in part, by a leading sidewall 113, and an opposite trailing sidewall 114. Still further, the housing is defined, at least in part, by spaced laterally disposed sidewalls 115, and which depend typically, vertically downwardly relative to the top surface 112. The top surface 112, and leading and trailing sidewalls 113 and 114, respectively, in combination, define an internal cavity 116, and which is operable to enclose various components which comprise the reciprocally moveable driver 110.

Referring still to FIG. 13, it will be seen in that form of the reciprocally moveable driver 110, that multiple fastener apertures 120 are respectively formed in each of the leading and trailing sidewalls 113 and 114, respectively. Still further, multiple elongated fastener apertures 121 are formed in each of the spaced laterally disposed sidewalls 115 of the reciprocally moveable driver 110 housing 111. Still further, multiple fastener apertures 122 for securing individual spring bracket bases are formed in each of the spaced laterally disposed sidewalls 115. As seen in FIG. 13, individual driver weights 123 having a predetermined weight of less than about 60 kg are mounted in juxtaposed covering relation relative to each of the leading and trailing sidewalls 113 and 114, respectively. As seen, in FIG. 13 individual fastener apertures 124 are formed through the individual driver weights 123 so as to coaxially align with the multiple fastener apertures 120 which are formed in the leading and trailing sidewalls 113 and 114, respectively. Still further, as will be recognized in FIG. 13, individual spring brackets 125 are provided, and which are positioned within the internal cavity 116 of the housing 111, and are further substantially aligned with the multiple fastener apertures 122. The spring brackets are oriented in covering relation relative to the fastener apertures 122, and are secured in the internal cavity 116 by welding or the like. The individual spring brackets 125 are operable to be coupled to a second multiplicity of elongated springs as will be described in greater detail below.

As best seen in FIG. 13, the first form of the reciprocally moveable driver 110 is formed, in part, by a pair of selectively energizable electromagnets which are generally indicated by the numeral 130. The pair electromagnets 130 are secured within the internal cavity 116, and are disposed in predetermined spaced relation one relative to the other. The pair of electromagnets includes a first electromagnet 131, and a second spaced electromagnet 132. The respective electromagnets 131 and 132 are releasably mounted on the spaced laterally disposed sidewalls 115, and which form a portion of the housing 111 for enclosing the reciprocally moveable driver 110. As best appreciated by a study of FIGS. 18A and 18B, respectively, the respective first and second electromagnets 131 and 132 have a U-shaped main body 133 which is defined, in part, by spaced legs 133A and 133B, respectively. As seen in FIG. 13 the elongated apertures 121 provide a convenient means whereby the respective electromagnets 131 and 132 can be spatially adjusted in a longitudinal direction relative to the internal cavity 116 of the housing 111. The respective electromagnets 131 and 132, respectively, have an outside facing surface 142 which creates a gap 143 of predetermined dimensions between the first and second electromagnets 131 and 132, respectively. When selectively energized by the electrical coils 140 (FIGS. 18A and 18B), the respective electromagnets 131 and 132 create pairs of magnetic fields 144, as illustrated in FIGS. 18A and 18B, and which magnetically cooperate or interact with the driving assembly coupler 90, as earlier described, so as to effect movement of the reciprocally moveable driver 110 along a reciprocal path of travel, and which will be described in greater detail below. As should be understood, the driving assembly coupler 90 has a transverse dimension which is less than the transverse or width dimension of the gap 143 which is measured between the outside facing surfaces 142 of the respective first and second electromagnets 130. Consequently, the driving assembly coupler 90 will closely fit within the gap 143 and will further be located at a predetermined, spaced, distance from each of the electromagnets 131 and 132, respectively.

Figure 7:
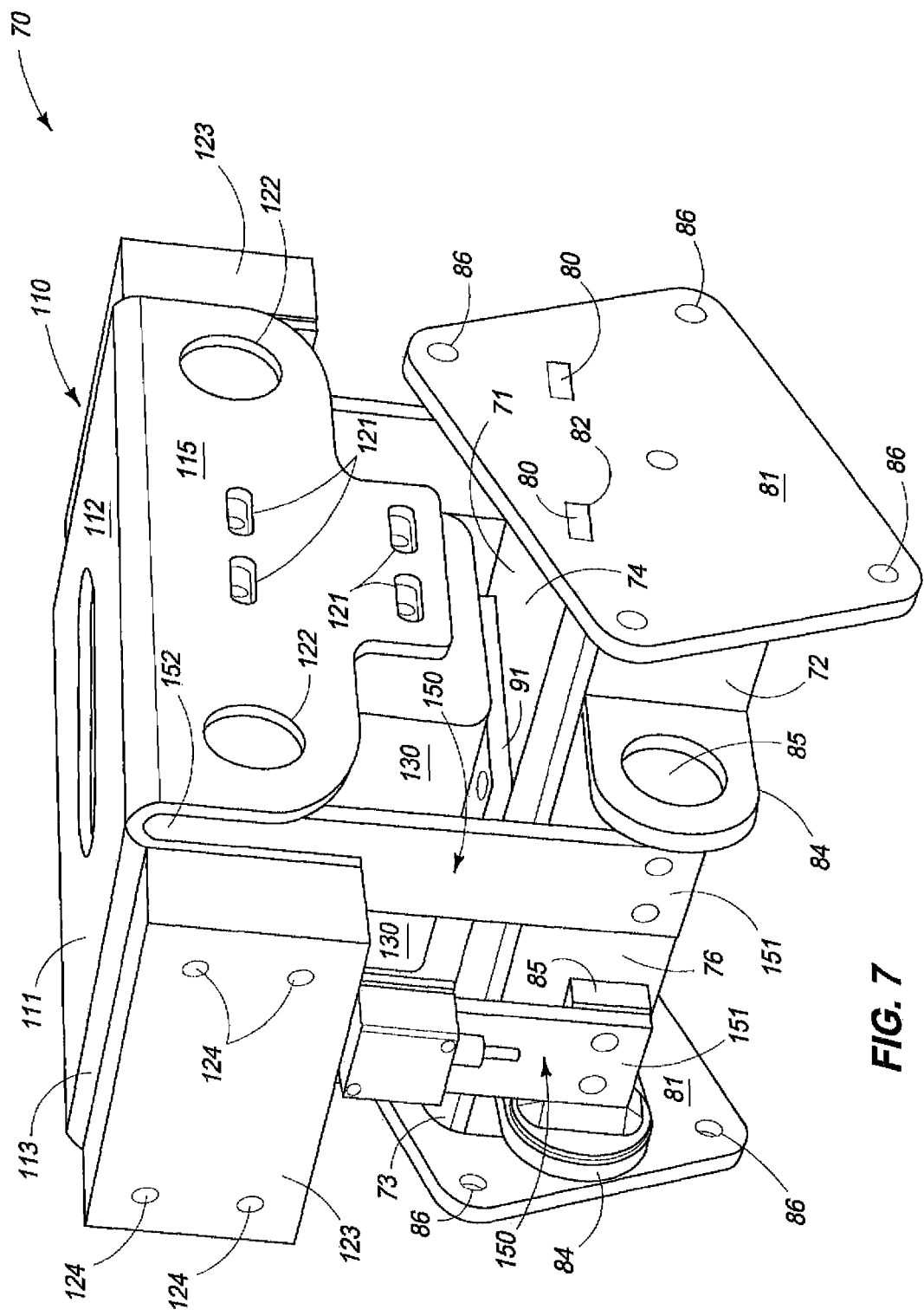
FIG. 7 is a perspective, side elevation view of a conveyor bed driving assembly which forms a feature of the present invention.
Figure 8:
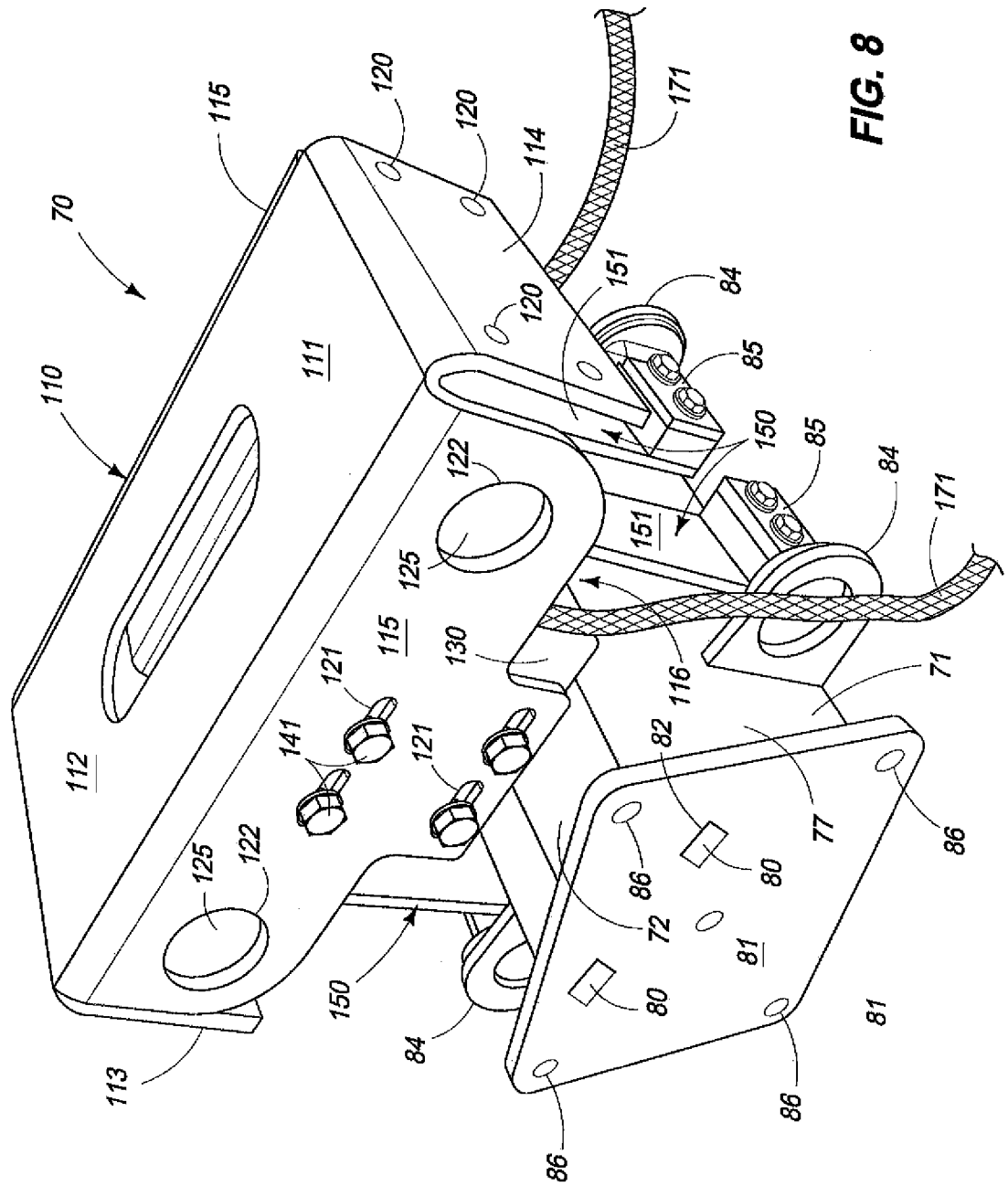
FIG. 8 is a second, perspective, side elevation view of the conveyor bed driving assembly which forms a feature of the present invention.
Figure 9:
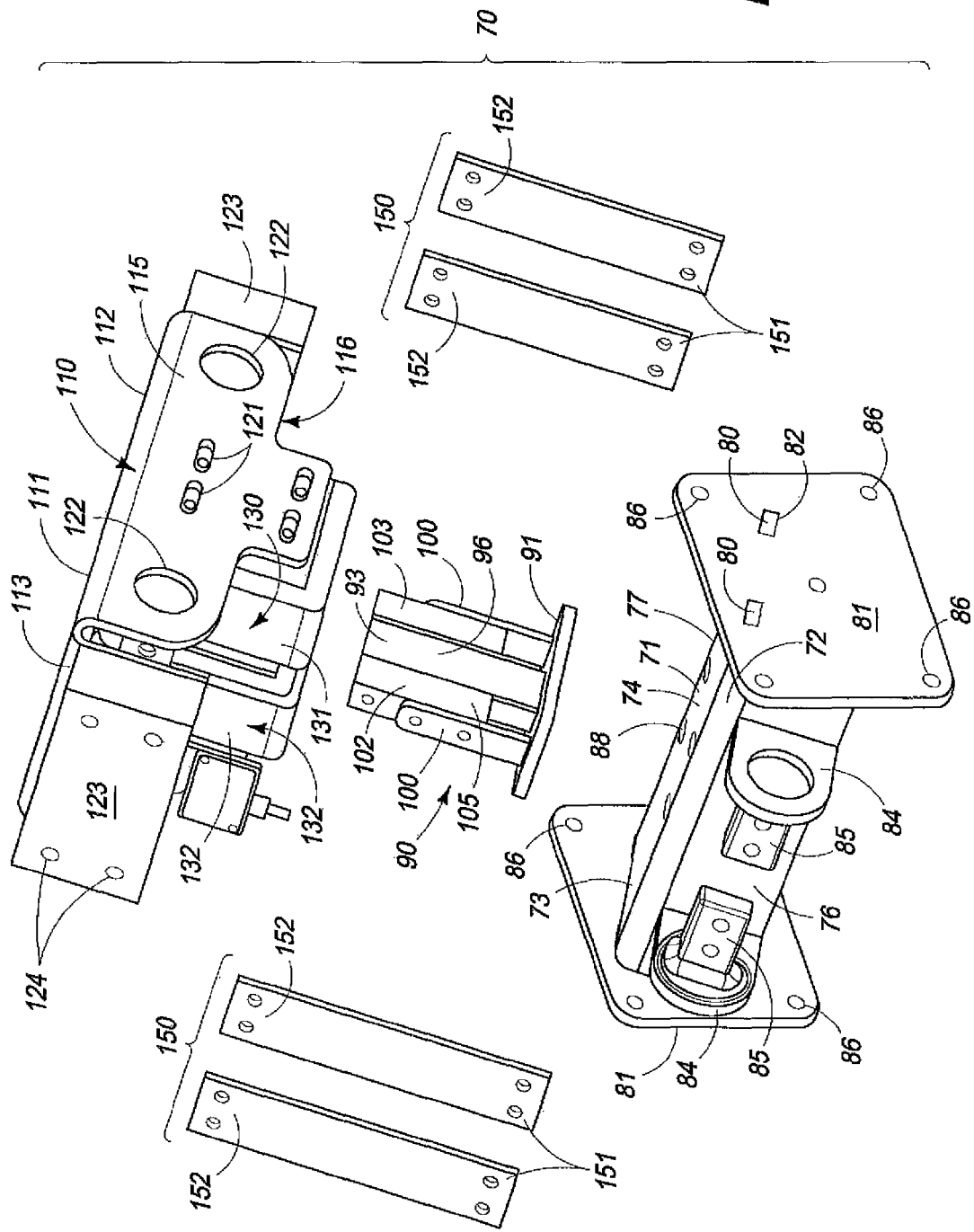
FIG. 9 is a fragmentary, exploded, perspective, side elevation view of the conveyor bed driving assembly which forms a feature of the present invention.

As best seen in FIG. 7 and following, the conveyor bed driving assembly 110, and more specifically the driver housing 111 thereof is supported in predetermined spaced relationship relative to the non-moveable support member 71 by a second multiplicity of elongated springs 150 that have predetermined dimensions. As seen in FIG. 9, the second multiplicity of elongated springs 150 have a first end 151 which is affixed to the leading and trailing peripheral edges 76 and 77, respectfully, of the non-moveable support member 71, and an opposite, second, resiliently movable end 152 which is mounted near the leading and trailing sidewalls 113 and 114, respectively, and which is affixed to the laterally disposed sidewalls 115 of the housing 111. As best seen by reference to FIGS. 18A and 18B, the second multiplicity of elongated springs 150 locates or otherwise positions the driver housing 111, and which carries the respective electromagnets 130 in an off-center positional relationship 133 relative to the driving assembly coupler 90, when the respective electromagnets 130 are de-energized. However, when the respective electromagnets 130 are energized, and the pair of magnetic fields 144 magnetically cooperate, or interact, with the driving assembly coupler 90, the driver housing 111 is urged or otherwise propelled into an aligned positional relationship 154 as seen in FIG. 18B. When moved to the aligned positional relationship 154, the housing 111 is effective in resiliently bending the second multiplicity of elongated springs 150. When the respective electromagnets 130 are deenergized, the previously bent second multiplicity of elongated springs 150 are effective in returning the housing 111 back to the off-center positional relationship 153 as seen in FIG. 18A. This movement of the driver housing 111 occurs along a second path of travel which is generally indicated by the numeral 160. As noted above, when electrically energized, the electromagnets 130 are effective to move the driver housing to a first forward position which is generally indicated by the numeral 161 (FIG. 18B), and which is effective in resiliently bending the second multiplicity of elongated springs 150. However, when deenergized, the driver housing 111, under the influence of the bent second multiplicity of elongated springs 150, returns to a second rearward position 162 (FIG. 18A). The repeated energizing and de-energizing of the electromagnets 130 creates a physical force 163 (FIG. 3) which is directed along a line of force 164 (FIG. 1). This line of force 164 passes through the center of mass 54 of the reciprocally moveable conveyor bed 50. The repeated energizing/de-energizing of the electromagnets 130 is effective to cause reciprocal motion of the conveyor bed 50 in the manner which will be discussed in the operation phase of the present application. The present invention 10 includes a controller which is generally indicated by the numeral 170 in FIG. 1. The controller sends electrical signals by way of an electrical conduit 171 to the respective electromagnets 131 and 132, respectively, in order to generate the reciprocal movement of the driver housing 160 along the second path of travel 161.

Further, the accelerometer 57 provides feedback information on the movement of the conveyor bed 50, so as to allow for effective control of the movement of the product 63.

Figure 9A:
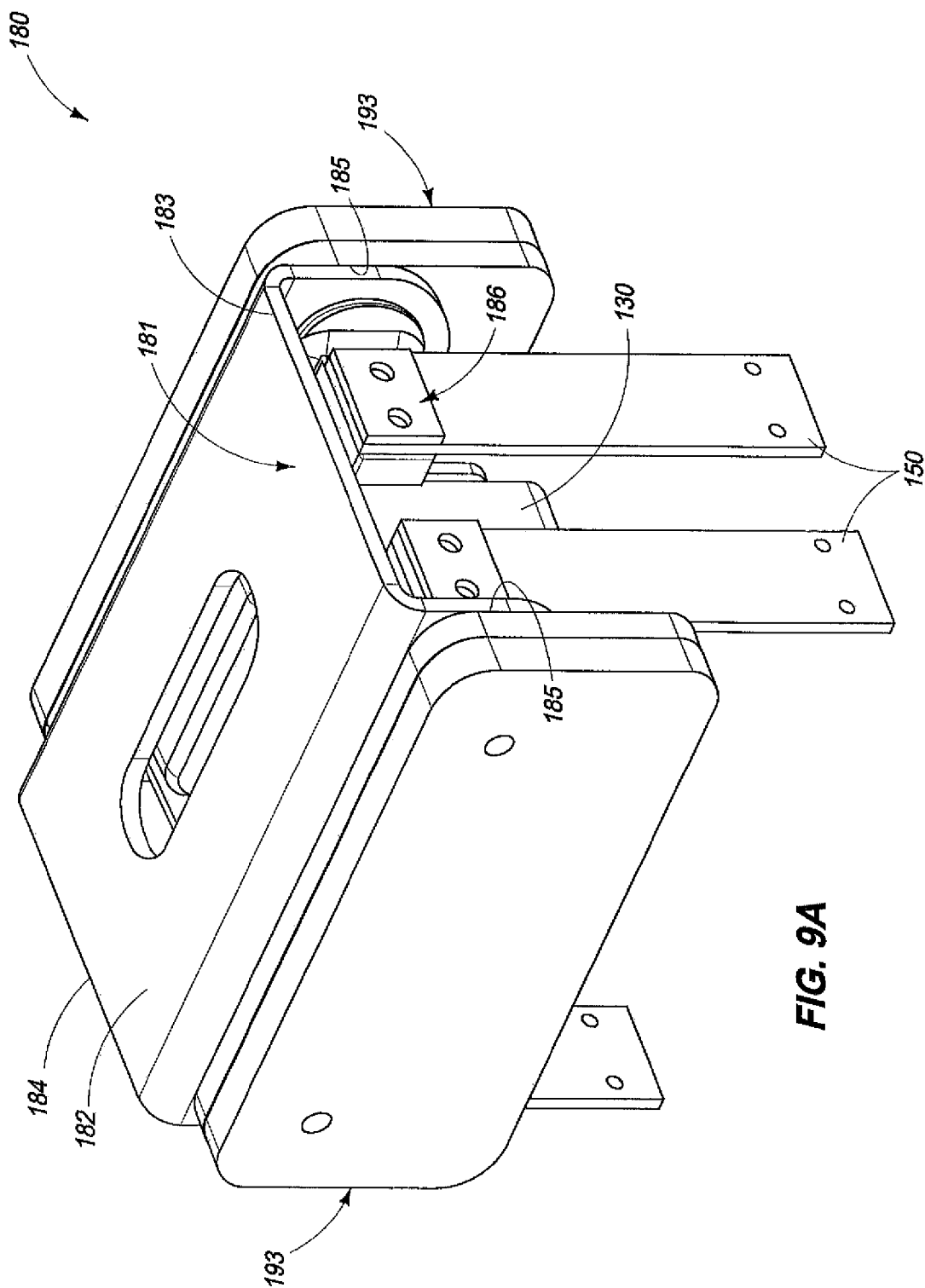
FIG. 9A is a fragmentary, perspective, side elevation view of a second form of the conveyor bed driving assembly which forms a feature of the present invention.
Figure 9B:
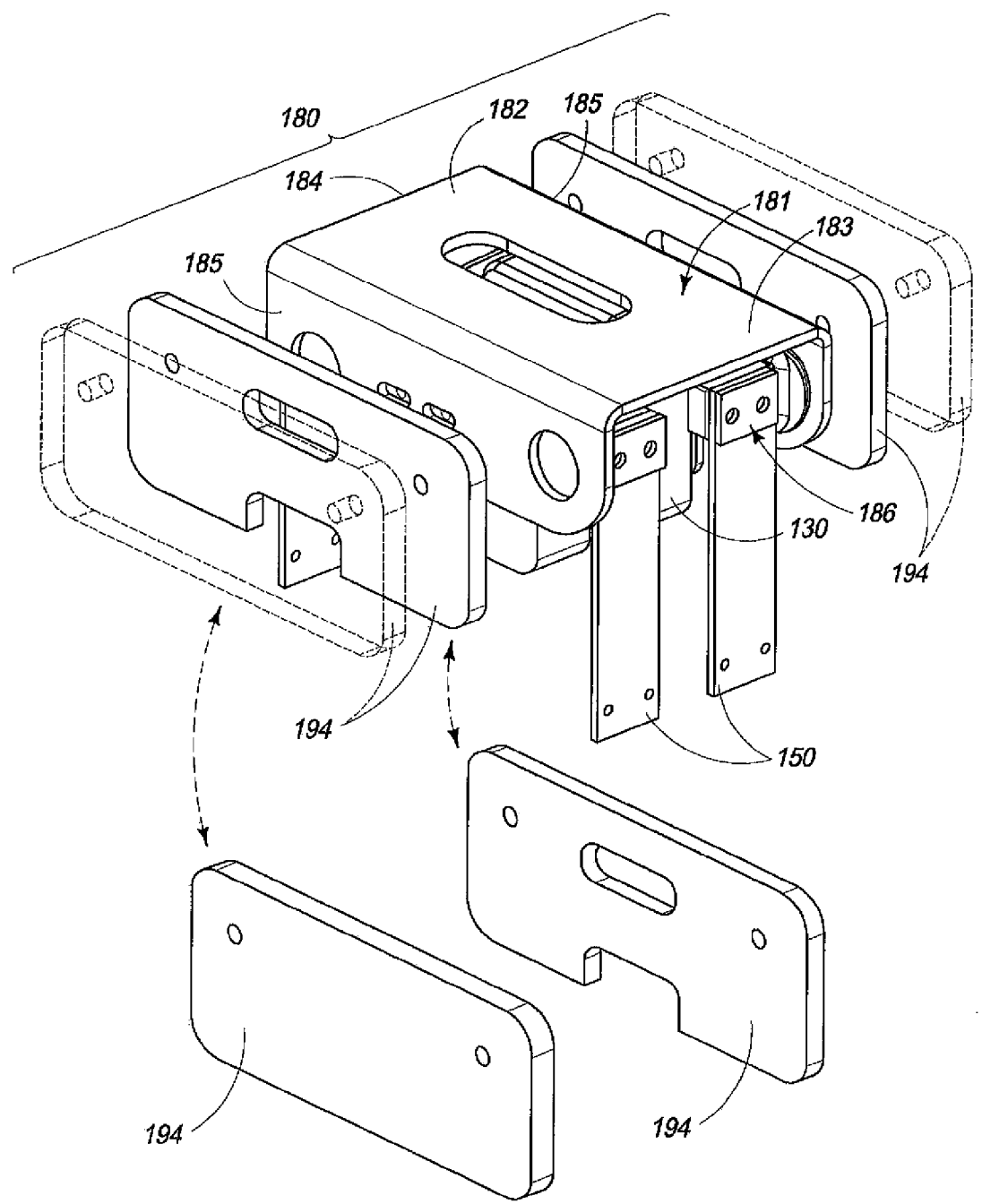
FIG. 9B is a fragmentary perspective, exploded, side elevational view of the second form of the conveyor bed driving assembly, as seen in FIG. 9A.

A second form of the moveable driver 180 is seen in FIGS. 9A and 9B, respectively. For purposes of brevity, common structures bear similar numbers, and have similar functions. The second form of the moveable driver includes a housing 181, which has a top surface 182, a leading peripheral edge 183, and a trailing peripheral edge 184. Further, the housing 181 is defined, at least in part, by a pair of laterally, spaced and substantially parallel side wall 185. The sidewalls 185, are similar in structure to the sidewalls 115, as previously described. Again, the housing 111 defines an internal cavity 186 for enclosing the earlier mentioned electromagnets 130. In the second form of the moveable driver 180, the previously mentioned driver weights 123, and which were mounted on the leading and trailing sidewalls which are absent in this form of the invention, now have driver weights 193, which are mounted on each of the sidewalls 185. The respective driver weights are formed of two plates 194, which are fastened together, and to the housing 181, as illustrated in FIGS. 9A and 9B, respectively. The second form of the moveable driver otherwise operates in a manner similar to that which was earlier described.

Operation

The operation of the described embodiments of the present invention are believed to be readily apparent and are briefly summarized at this point.

In its broadest aspect, the present invention 10 relates to a vibratory conveyor which includes a base frame 13 and which is positioned on a supporting surface 11. The vibratory conveyor 10 further includes a reciprocally moveable conveyor bed 50 for supporting a product 63 for movement along the reciprocally moveable conveyor bed 50. In its broadest aspect, the vibratory conveyor 10 includes a first multiplicity of elongated springs 40 which are mounted on the base frame 13, and which resiliently support the reciprocally moveable conveyor bed 50 in spaced relation relative to the base frame 13. Further, the vibratory conveyor 10 includes a conveyor bed driving assembly 70 which is mounted on the base frame 13, and wherein the conveyor bed driving assembly 70 has a non-moveable support member 71 which is mounted on the base frame 13. The conveyor bed driving assembly 70 includes a reciprocally moveable driver 110 which is biasingly supported on the non-moveable support member 71, and which further, when selectively energized, magnetically cooperates or interacts with the non-moveable support member 71 so as to impart movement of the reciprocally moveable driver 110 or 180 along a given path of travel 160, and simultaneously generates a physical force 163 which is directed along a line of reference 164 which passes through the reciprocally moveable conveyor bed 50. The physical force end 163 is effective in causing reciprocal motion of the reciprocally moveable conveyor bed 50.

As earlier discussed, the reciprocally moveable conveyor bed 50 has a center of mass 54, and the line of reference 164 of the generated physical force 163 passes through the center of mass 54 of the reciprocally moveable conveyor bed 50. In the arrangement as seen in the drawings, the base frame 13 has a first, and an opposite, second end 14 and 15, respectively, and the vibratory conveyor 10 further has a predetermined, weighted base frame mass 26 which is mounted on the base frame 13. The conveyor bed driving assembly 70 is mounted on the base frame 13, and is located between the first and second ends 14 and 15 of the base frame 13. In the arrangement as seen in the drawings, the base frame 13 is defined, at least in part, by a longitudinal axis 16, and the non-moveable support member 71 is oriented transversely relative to the longitudinal axis 16 of the base frame 13. The non-moveable support member 71 has opposite, first and second ends 72 and 73; top and bottom surfaces 74 and 75; and a leading and trailing peripheral edges 76 and 77, respectively. Still further, a mounting plate 81 is individually affixed to the opposite first and second ends 72 and 73 of the non-moveable support member 71.

As seen in the drawings, the non-moveable support member 71 further has a second multiplicity of elongated springs 150 which are mounted on each of the leading and trailing peripheral edges 76 and 77 thereof, and which further support the reciprocally moveable driver 110/180 in predetermined, spaced relation relative to the non-movable support member 71, and the reciprocally moveable conveyor bed 50, respectively. In addition to the foregoing, the reciprocally moveable driver 110 further has a housing 111/180 which defines an internal cavity 116/186. The driver housing 111/181 is defined, at least in part, by a leading and trailing sidewall 113 and 114, respectively, and spaced, laterally disposed sidewalls 115/185. The second multiplicity of elongated springs 150 which are mounted on each of the leading and trailing peripheral edges 113 and 114 of the non-moveable support member 76 and 77, respectively, are each respectively mounted on the sidewalls 115/185 of the driver housing 111/181. As seen in the drawings, a driver weight 123/193 having a predetermined mass, and which is releasably mounted on the driver housing 111/181, and more specifically to the leading and trailing sidewalls 113 and 114, or the sidewalls 185, thereof is provided.

As seen in the drawings, the vibratory conveyor 10 further includes a pair of selectively energizable electromagnets 130 which are individually mounted on each of the spaced, laterally disposed sidewalls 115/185 of the driver housing 111/181, and which are further located within the internal cavity 116/186 thereof. The respective electromagnets 130 are located in spaced relation, one relative to the other, and further define a magnetic gap 143 of predetermined dimensions between them. Each electromagnet 130 has a north and south pole 134 and 135, respectively, and which when selectively energized, are magnetically attracted to the electromagnet 130 which is positioned across the magnetic gap 143.

The vibratory conveyor 10 further includes a driving assembly coupler 90 which is mounted on the top surface 74 of the non-moveable support member 71, and which further is sized so as to be received in the magnetic gap 143 that is defined between the respective electromagnets 130, and which are mounted within the internal cavity 116 of the driver housing 111. The driving assembly coupler 90 comprises a centrally disposed, stainless steel support member 93, and leading and trailing stainless steel portions 102 and 103 respectively, and which are located on opposite sides of the centrally disposed support portion 93, and which are further fastened to the support portion 93. The second multiplicity of elongated springs 150 which support the driving assembly 70, position the driver housing 111/181 carrying the respective electromagnets 30 in an off-center positional relationship 153 relative to the driving assembly coupler 90 when the electromagnets 130 are deenergized, and further magnetically draws the driver housing 111/181 carrying the respective electromagnets 130 into an aligned positional relationship 154 with the driving assembly coupler 90 (FIG. 18A) when the electromagnets 130 are energized. The alignment of the respective energized electromagnets 130 with the driving assembly coupler 90 resiliently bends the respective second multiplicity of elongated springs 150 which are mounted on the non-moveable support member 71. As should be understood, and upon deenergizing the respective electromagnets 130, the previously resiliently bent, second multiplicity of elongated springs 150, returns the driver housing 111 which is carrying the respective, deenergized electromagnets 130 back to the off-center positional relationship relative to the driving assembly coupler 90. This is seen most clearly by reference to a study of FIGS. 18A and 18B, respectively.

As should be appreciated, the path of movement 160 of the selectively moveable driver 110 is defined between the off-center positional relationship 153 of the electromagnets 130 when the electromagnets are deenergized relative to the driving assembly coupler 90, and the aligned relationship 154 of the respective electromagnets 130 with the driving assembly coupler 90 when the respective electromagnets are energized (FIG. 18B). The present invention 10 includes a controller 170 which is electrically coupled with each of the electromagnets 130, and which further selectively, electrically energizes the respective electromagnets during predetermined time intervals so as generate a given vibratory motion to the reciprocally moveable conveyor bed 50 so as to effect product movement 63 along the reciprocally moveable conveyor bed 50. In the arrangement as seen in the drawings, the reciprocally moveable conveyor bed 50, and the base frame 13, each have a given weight, and wherein the ratio of the weight of the base frame 13 relative to the reciprocally moveable conveyor bed 50 is about 2:1. Still further, it should be understood that the weighted base frame mass 26 which is borne by the base frame 13 has a weight of less than about 120 kg; and the driver weight 23 which is mounted on the driver housing 111 is less than about 60 Kg. Still further, the path of travel 160 of the reciprocally moveable driver 110 has a length of less than about 10 mm. Additionally, the reciprocally moveable conveyor bed 50 moves along a path of travel 60 which has a length of less than about 20 mm. In addition to the foregoing, the first multiplicity of elongated springs 40 which are resiliently supporting the reciprocally moveable conveyor bed 50 have a length dimension of about 1200 mm to about 4000 mm.

More specifically, the present invention includes a vibratory conveyor 10 which has a base frame 13 which is positioned on a supporting surface 11, and which further has opposite first and second ends 14 and 15, respectively. The base frame 13 is further defined, at least in part, by a longitudinal axis 16. The vibratory conveyor includes a first multiplicity of elongated springs 40 which each have a first end 41, which are individually mounted on the base frame 13, and an opposite, resiliently moveable second end 15, and wherein the first multiplicity of elongated springs 40 are mounted in predetermined, spaced relation, one, relative to the others, on the base frame 13. The vibratory conveyor 10 further includes a reciprocally moveable conveyor bed 50 for supporting a product 63 for movement along the reciprocally moveable conveyor bed 50. The reciprocally moveable conveyor bed 50 has a first, product intake end 51, and an opposite, second, product discharge end 52. The second end 42 of each of the first multiplicity of elongated springs 40 is mounted on the reciprocally moveable conveyor bed 50. The first multiplicity of elongated springs 40 positions the reciprocally moveable conveyor bed 50 in predetermined, spaced relation relative to the base frame 13. The reciprocally moveable conveyor bed 50 is further carried along a reciprocal first path of travel 60 by the first plurality of elongated springs 40. The first path of travel 60 is defined, at least in part, by a first course of travel 61, and where the reciprocally moveable conveyor bed 50, in the first course of travel 61, moves in a longitudinally, forward direction, and a second course of travel 62, and where the reciprocally moveable conveyor bed 50, in the second course of travel 62, moves in an opposite, longitudinally, rearward direction.

The vibratory conveyor 10 includes a conveyor bed driving assembly 70 which is mounted on the base frame 13, and which is further located between the first, and second ends 14 and 15 of base frame 13. The conveyor bed driving assembly 70 includes a transversely disposed, non-moveable support member 71 which is mounted on the base frame 13. The conveyor bed driving assembly 70 further has a second multiplicity of elongated springs 150 which each have a first end 151 that are individually mounted on the transversely disposed, non-moveable support member 71, and an opposite, resiliently moveable second end 152. The conveyor bed driving assembly 70 further has a reciprocally moveable driver housing 111 which is mounted on the second end 152 of the second multiplicity of elongated springs 150, and which further defines an internal cavity 116. The conveyor bed driving assembly 70 further has a pair of selectively energizable electromagnets 130 which are mounted within the internal cavity 116 of the reciprocally moveable driver housing 111, and which are further oriented in predetermined spaced relation, one relative to the other. This spacing of the electromagnets creates a gap 143 of predetermined dimensions which is defined between the respective electromagnets 130. The conveyor bed driving assembly 70 further has a driving assembly coupler 90 which is mounted on the non-moveable support member 71, and which is further sized so as to be received within the gap 143, and disposed in spaced relation relative to each of the respective selectively energizable electromagnets 130. The respective electromagnets 130, when energized magnetically interacts with the driving assembly coupler 90 in a manner so as to propel the driver housing 111 along a second path of travel 160 to a first, forward position 161, and which simultaneously, and resiliently bends, the second multiplicity of elongated springs 150 which are mounted on the conveyor bed driving assembly 170. The propulsion of the driver housing 111 to the first, forward position 161 generates a physical force 163 which is directed toward the reciprocally moveable conveyor bed 50, and which further, simultaneously, causes the reciprocally moveable conveyor bed 50 to move along the second course 62 of the first path of travel 60 of the reciprocally moveable conveyor bed 50, and which is in a longitudinal, rearward direction. The movement of the reciprocally moveable conveyor bed 50 along the second course of travel 62 resiliently bends the respective first multiplicity of elongated springs 40 which resiliently support the reciprocally moveable conveyor bed 50 on the base frame 13. The electromagnets 130, when deenergized, allows the previous, resiliently bent, second multiplicity of elongated springs 150 to propel the driver housing 111 along the second path of travel 160 to a second, rearward position 162. As should be understood, the movement of the driver housing 111 to the second, rearward position 162 causes the previously bent, first multiplicity of elongated springs 40 to propel the reciprocally moveable conveyor bed 50 along the first course of travel 61 of the reciprocally moveable conveyor bed 50 in a longitudinally forward direction. In the present form of the invention the vibratory conveyor 10 includes a controller 170 which is electrically coupled with the respective selectively energizable electromagnets 130, and which selectively electrically energizes the respective electromagnets 130 so as to cause a predetermined reciprocal motion of the conveyor bed 50, and which facilitates the movement of the product 63 from the first to the second ends 51 and 52, respectively of the reciprocally moveable conveyor bed 50.

Therefore, it will be seen that the present invention provides a convenient means by which a reciprocally moveable conveyor bed can be energized and reciprocated in a desired fashion so as to move a given product along the conveying surface. The present invention avoids many of the detriments associated with the prior art practices and allows a user to energize and deenergize the vibratory conveyor in a manner so as to avoid adverse movement of the reciprocally moveable conveyor bed which has been experienced by the previous driving assemblies utilized with such prior art devices. The present invention, and more specifically, the driver assembly thereof is readily electrically adjustable, and provides a convenient means by which product 63 can be handled in a manner not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A vibratory conveyor, comprising:
 a base frame which is positioned on a supporting surface;
 a reciprocally moveable conveyor bed for supporting a product for movement along the reciprocally moveable conveyor bed;
 a first multiplicity of elongated springs which are mounted on the base frame, and which resiliently support the reciprocally moveable conveyor bed in spaced relation relative to the base frame; and
 a conveyor bed driving assembly mounted on the base frame, and wherein the conveyor bed driving assembly has a non-moveable support member which is mounted on the base frame, and a reciprocally moveable driver which is biasingly supported on the non-moveable support member, and which further, when selectively energized, magnetically cooperates with the non-moveable support member so as to impart movement of the reciprocally moveable driver along a given path of travel, and simultaneously generates a physical force which is directed along a line of reference which passes through the reciprocally moveable conveyor bed, and is effective in causing reciprocal motion of the reciprocally moveable conveyor bed.

2. A vibratory conveyor as claimed in claim 1, and wherein, the reciprocally moveable conveyor bed has a center of mass, and wherein the line of reference of the generated physical force passes through the center of mass of the reciprocally moveable conveyor bed.

3. A vibratory conveyor as claimed in claim 2, and wherein the base frame has a first, and an opposite, second end, and wherein a predetermined, weighted base frame mass, is mounted on the base frame, and wherein the conveyor bed driving assembly is mounted on the base frame, and is located between the first and second ends of the base frame.

4. A vibratory conveyor as claimed in claim 3, and wherein the base frame is defined, at least in part, by a longitudinal axis, and wherein the non-moveable support member is oriented transversely relative to the longitudinal axis of the base frame, and wherein the non-moveable support member has opposite, first and second ends; top and bottom surfaces; and a leading and trailing peripheral edge.

5. A vibratory conveyor as claimed in claim 4, and wherein the non-moveable support member further has a second multiplicity of elongated springs and which have a first end which is mounted on each of the leading and trailing peripheral edges thereof, and extend outwardly relative thereto, and which further support the reciprocally moveable driver in predetermined, spaced relation relative to each of the non-moveable support member, and the reciprocally moveable conveyor bed.

6. A vibratory conveyor as claimed in claim 5, and wherein the reciprocally moveable driver further has a housing which defines an internal cavity, and wherein the driver housing is defined, at least in part, by a leading and trailing sidewall, and spaced, laterally disposed sidewalls, and wherein a second end of the second multiplicity of elongated springs which are mounted on each of the leading and trailing peripheral edges of the non-moveable support member, are each respectively mounted on the individual leading and trailing sidewalls of the driver housing.

7. A vibratory conveyor as claimed in claim 6, and further comprising a driver weight having a predetermined mass, and which is releasably mounted on the driver housing.

8. A vibratory conveyor as claimed in claim 7, and further comprising a pair of selectively energizable electromagnets which are individually mounted on each of the spaced, laterally disposed sidewalls of the driver housing, and which are further located within the internal cavity thereof, and wherein the respective electromagnets are located in spaced relation, one relative to the other, and further defines a magnetic gap of predetermined dimensions between them, and wherein each magnet has a north and south pole which, when energized, are magnetically attracted to the weak iron portion which is positioned in spaced relation thereto and in the magnetic gap, and wherein the selective energizing of the respective electromagnets can charge the north and south poles thereof.

9. A vibratory conveyor as claimed in claim 8, and further comprising a driving assembly coupler which is mounted on the top surface of the non-moveable support member, and which further is sized so as to be received in the magnetic gap that is defined between the respective electromagnets, and which are mounted within the internal cavity of the driver housing, and wherein the driving assembly coupler comprises a centrally disposed, stainless steel support member, and leading and trailing stainless steel portions which are located on opposite sides of the centrally disposed stainless steel portion, and which are further fastened to the support member, and wherein, the second multiplicity of elongated springs which support the driving assembly, position the driver housing carrying the respective electromagnets in an off-center positional relationship relative to the driving assembly coupler when the electromagnets are deenergized, and further magnetically draws the driver housing carrying the respective electromagnets into an aligned positional relationship with the driving assembly coupler when the electromagnets are energized, and wherein the alignment of the respective energized electromagnets with the driving assembly coupler resiliently bends the respective second multiplicity of elongated springs which are mounted on the non-moveable support member, and wherein upon deenergizing the respective electromagnets, the previously resiliently bent, second multiplicity of elongated springs, returns the driver housing which is carrying the respective, deenergized electromagnets back to the off center positional relationship relative to the driving assembly couple, and wherein the selective energizing of the respective electromagnets generates a predetermined displacement of the reciprocally moveable driver.

10. A vibratory conveyor, as claimed in claim 9, and wherein the path of movement of the selectively moveable driver is defined between the off-center positional relationship of the electromagnets when the electromagnets are deenergized relative to the driving assembly coupler, and the aligned relationship of the respective electromagnets with the driving assembly coupler when the respective electromagnets are energized.

11. A vibratory conveyor, as claimed in claim 10, and further comprising a controller which is electrically coupled with each of the electromagnets, and which further selectively, electrically energizes the respective electromagnets during predetermined time intervals so as generate a given vibratory motion to the reciprocally moveable conveyor bed and which effects product movement along the reciprocally moveable conveyor bed.

12. A vibratory conveyor, as claimed in claim 11, and wherein the reciprocally moveable conveyor bed, and the base frame, each have a given weight, and wherein the ratio of the weight of the base frame relative to the reciprocally moveable conveyor bed is about 2:1.

13. A vibratory conveyor, as claimed in claim 12, and wherein the weighted base frame mass borne by the base frame is about 120 kg; and wherein the driver weight mounted on the driver housing is about 60 kg.

14. A vibratory conveyor, as claimed in claim 13, and wherein the path of travel of the reciprocally moveable driver has a variable length of less than about 10 millimeters.

15. A vibratory conveyor, as claimed in claim 14, and wherein the reciprocally moveable conveyor bed moves along a variable path of travel which has a length of less than about 20 millimeters.

16. A vibratory conveyor, as claimed in claim 15, and wherein the first multiplicity of elongated springs which are resiliently supporting the reciprocally moveable conveyor bed have a length dimension of about 1200 mm to about 4000 mm; and the second multiplicity of elongated springs which are resiliently supporting the reciprocally moveable driver have a length dimension of about 300 mm to about 1500 mm.

17. A vibratory conveyor, comprising:
a base frame which is positioned on a supporting surface, and which further has opposite first and second ends, and wherein the base frame is further defined, at least in part, by a longitudinal axis;
a first multiplicity of elongated springs which each have a first end, which are individually mounted on the base frame, and an opposite, resiliently moveable second end, and wherein the first multiplicity of elongated springs are mounted in predetermined, spaced relation, one relative to the others;
a reciprocally moveable conveyor bed for supporting a product for movement along the reciprocally moveable conveyor bed, and wherein the reciprocally moveable conveyor bed has a first, product intake end, and an opposite, second, product discharge end, and wherein the second end of each of the first multiplicity of elongated springs is mounted on the reciprocally moveable conveyor bed, and wherein the first multiplicity of elongated springs positions the reciprocally moveable conveyor bed in predetermined, spaced relation relative to the base frame, and wherein the reciprocally moveable conveyor bed is further carried along a reciprocal first path of travel by the first plurality of elongated springs, and wherein the first path of travel is defined, at least in part, by a first course of travel, and where the reciprocally moveable conveyor bed, in the first course of travel, moves in a longitudinally, forward direction, and a second course of travel, and where the reciprocally moveable conveyor bed, in the second course of travel, moves in an opposite, longitudinally, rearward direction;

a conveyor bed driving assembly which is mounted on the base frame, and which is further located between the first, and second ends of base frame, and wherein the conveyor bed driving assembly includes a transversely disposed, non-moveable support member which is mounted on the base frame, and wherein the conveyor bed driving assembly further has a second multiplicity of elongated springs which each have a first end that are individually mounted on the transversely disposed, non-moveable support member, and an opposite, resiliently moveable second end, and wherein the conveyor bed driving assembly further has a reciprocally moveable driver housing which is mounted on the second end of the second multiplicity of elongated springs, and which further defines an internal cavity, and wherein the conveyor bed driving assembly further has a pair of selectively energizable electromagnets which are mounted within the internal cavity of the reciprocally moveable driver housing, and which are further oriented in predetermined spaced relation, one relative to the other, and wherein a gap of predetermined dimensions is defined between the respective electromagnets, and wherein the conveyor bed driving assembly further has a driving assembly coupler which is mounted on the non-moveable support member, and which is further sized so as to be received within the gap, and is further disposed in spaced relation relative to each of the respective selectively energizable electromagnets, and wherein the respective electromagnets, when selectively energized magnetically interacts with the driving assembly coupler in a manner so as to propel the driver housing along a second path of travel to a first, forward position, and which simultaneously and resiliently bends the second multiplicity of elongated springs which are mounted on the conveyor bed driving assembly, and wherein the propulsion of the driver housing to the first, forward position generates a physical force which is directed toward the reciprocally moveable conveyor bed, and which further, simultaneously, causes the reciprocally moveable conveyor bed to move along the second course of the first path of travel of the reciprocally moveable conveyor bed, and which is in a longitudinal, rearward direction, and wherein movement of the reciprocally moveable conveyor bed along the second course of travel resiliently bends the respective first multiplicity of elongated springs which resiliently support the reciprocally moveable conveyor bed on the base frame, and wherein the electromagnets, when deenergized, allows the previous, resiliently bent, second multiplicity of elongated springs to propel the driver housing along the second path of travel to a second, rearward position, and wherein movement of the driver housing to the second, rearward position causes the previously bent, first multiplicity of elongated springs to propel the reciprocally moveable conveyor bed along the first course of travel of the reciprocally moveable conveyor bed in a longitudinally forward direction; and a controller electrically coupled with the respective selectively energizable electromagnets, and which selectively electrically energizes the respective electromagnets so as to cause a predetermined reciprocal motion of the conveyor bed, and which facilitates the movement of the product from the first to the second end of the reciprocally moveable conveyor bed.

18. A vibratory conveyor as claimed in claim 17, and further comprising a weighted base frame mass which is mounted on the base frame.

19. A vibratory conveyor as claimed in claim 18, and wherein the driver housing is defined, at least in part, by a leading, and trailing sidewall, and wherein the second end of each of the second multiplicity of elongated springs are mounted adjacent to the respective leading and trailing sidewall, and wherein a driver weight, having a predetermined mass is mounted adjacent to each of the leading and trailing sidewalls of the driver housing.

20. A vibratory conveyor as claimed in claim 18, and wherein the driver housing is defined, at least in part, by a leading and trailing peripheral edge, and wherein the second end of each of the second multiplicity of elongated springs are mounted adjacent to the respective leading and trailing edges, and wherein the driver housing further includes spaced longitudinally extended sidewalls, and wherein a driver weight, having a predetermined mass is mounted on each of the longitudinally extending sidewalls of the driver housing.

21. A vibratory conveyor, as claimed in claim 17 and further comprising an accelerometer which is mounted in sensing relation relative to the reciprocally moveable conveyor bed, and which is further coupled in signal transmitting relation to the controller, so as to provide a feedback signal to the controller to allow for an operation adjustment of the conveyor bed driving assembly.

22. A vibratory conveyor as claimed in claim 19, and wherein the driving assembly coupler comprises a centrally disposed, stainless steel support member, and leading and trailing stainless steel portions, which are located on opposite sides of the centrally disposed stainless steel portion, and which are further fastened to the stainless steel support member, and wherein, the second multiplicity of elongated springs which are mounted on the driving assembly position the driver housing carrying the respective electromagnets in an off-center positional relationship relative to the driving assembly couplers when the electromagnets are deenergized, and further magnetically propels the driver housing carrying the respective electromagnets into an aligned positional relationship with the driving assembly coupler when the electromagnets are energized, and wherein the alignment of the respective energized electromagnets with the driving assembly coupler resiliently bends the respective second multiplicity of elongated springs which are mounted on the non-moveable support member, and wherein upon deenergizing the respective electromagnets, the previously resiliently bent, second multiplicity of elongated springs, returns the driver housing which is carrying the respective, deenergized electromagnets back to the off-center positional relationship relative to the driving assembly coupler.

23. A vibratory conveyor as claimed in claim 22, and wherein the reciprocally moveable conveyor bed has a center of mass, and wherein the physical force generated by the repeated movement of the conveyor bed driving assembly is directed along a line of reference which passes through the center of mass of the reciprocally moveable conveyor bed.

* * * * *